US009642136B2

(12) United States Patent
Du et al.

(10) Patent No.: US 9,642,136 B2
(45) Date of Patent: May 2, 2017

(54) METHOD AND DEVICE FOR ANCHOR MASTER SELECTION

(71) Applicant: Huawei Device Co., Ltd., Shenzhen, Guangdong (CN)

(72) Inventors: Zhenguo Du, Shenzhen (CN); Yunsong Yang, San Diego, CA (US); Ping Fang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 15/171,206

(22) Filed: Jun. 2, 2016

(65) Prior Publication Data
US 2016/0278086 A1 Sep. 22, 2016

Related U.S. Application Data

(63) Continuation of application No. PCT/CN2014/092816, filed on Dec. 2, 2014.

(30) Foreign Application Priority Data

Dec. 2, 2013 (CN) .......................... 2013 1 0634605
Jun. 27, 2014 (CN) .......................... 2014 1 0301914

(51) Int. Cl.
*H04J 1/16* (2006.01)
*H04J 3/14* (2006.01)
(Continued)

(52) U.S. Cl.
CPC ......... *H04W 72/0446* (2013.01); *H04L 45/20* (2013.01); *H04W 56/0015* (2013.01); *H04W 84/18* (2013.01)

(58) Field of Classification Search
CPC ........... H04W 72/044; H04W 56/0015; H04W 84/18; H04L 45/20
See application file for complete search history.

(56) References Cited

U.S. PATENT DOCUMENTS 7,502,354 B1 * 3/2009 Maufer ................. H04L 12/413
370/338
7,522,540 B1 * 4/2009 Maufer ................. H04L 45/18
370/254
(Continued)

FOREIGN PATENT DOCUMENTS

CN 102946634 A 2/2013
CN 103209461 A 7/2013
(Continued)

OTHER PUBLICATIONS

"Wi-Fi Neighbor Awareness Networking (NAN) Wi-Fi NAN Technical Specification Contribution", Wi-Fi Alliance Technical Task Group, Version 0.0, dated Nov. 2013, total 74 pages.
(Continued)

*Primary Examiner* — Lonnie Sweet
(74) *Attorney, Agent, or Firm* — Huawei Device Co., Ltd.

(57) ABSTRACT

A method for anchor master selection includes: a device receives a NAN Beacon frame, where the NAN Beacon frame carries first AM information and first TSF information, and the first AM information includes: a first AMR, a first HC, and a first AMBTT; if the NAN Beacon frame is used for AM selection, when the first AMR is less than a second AMR and an MR of the device is greater than the first AMR, switching a role of the device to AM, where second AM information recorded in the device includes: the second AMR, a second HC, and a second AMBTT; and if the NAN Beacon frame is used for AM selection, when the first AMR is less than the second AMR, and the MR of the device is less than the first AMR, updating the second AM information and second TSF information according to the NAN Beacon frame.

20 Claims, 17 Drawing Sheets

(51) Int. Cl.
*H04L 1/00* (2006.01)
*H04L 12/26* (2006.01)
*H04W 72/04* (2009.01)
*H04W 56/00* (2009.01)
*H04W 84/18* (2009.01)
*H04L 12/733* (2013.01)

(56) References Cited

U.S. PATENT DOCUMENTS

| | | | | |
|---|---|---|---|---|
| 7,606,175 | B1* | 10/2009 | Maufer | H04W 8/005 370/255 |
| 7,835,301 | B1* | 11/2010 | Maufer | H04W 24/02 370/254 |
| 9,226,231 | B2 | 12/2015 | Abraham et al. | |
| 9,510,286 | B2 | 11/2016 | Abraham et al. | |
| 9,516,595 | B2 | 12/2016 | Abraham et al. | |
| 2014/0192793 | A1 | 7/2014 | Abraham et al. | |
| 2014/0302787 | A1* | 10/2014 | Rantala | H04W 4/008 455/41.2 |
| 2015/0036540 | A1* | 2/2015 | Kasslin | H04W 48/18 370/254 |
| 2016/0249352 | A1* | 8/2016 | Kim | H04W 72/0446 |

FOREIGN PATENT DOCUMENTS

| | | |
|---|---|---|
| CN | 103369550 A | 10/2013 |
| CN | 104053227 A | 9/2014 |
| JP | 2003273849 A | 9/2003 |
| JP | 2009284054 A | 12/2009 |
| JP | 2016506215 A | 2/2016 |
| JP | 2016509779 A | 3/2016 |
| JP | 2016514919 A | 5/2016 |
| JP | 2016518047 A | 6/2016 |
| JP | 2016518048 A | 6/2016 |
| RU | 2011139361 A | 4/2013 |
| WO | 2010100322 A1 | 9/2010 |
| WO | 2013174428 A1 | 11/2013 |

OTHER PUBLICATIONS

Search report & Written Opinion issued in corresponding PCT application No. PCT/CN2014/092816, dated Mar. 3, 2015, with English translation, total 17 pages.

* cited by examiner

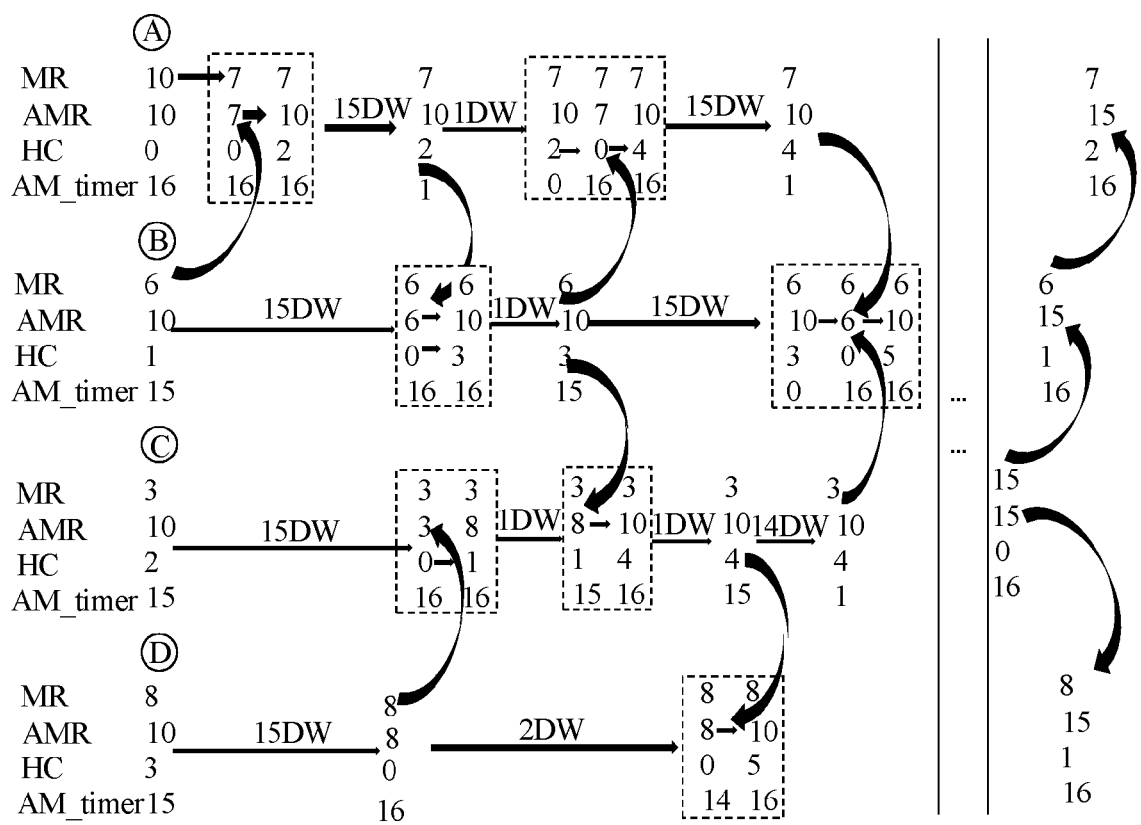
FIG. 5-a

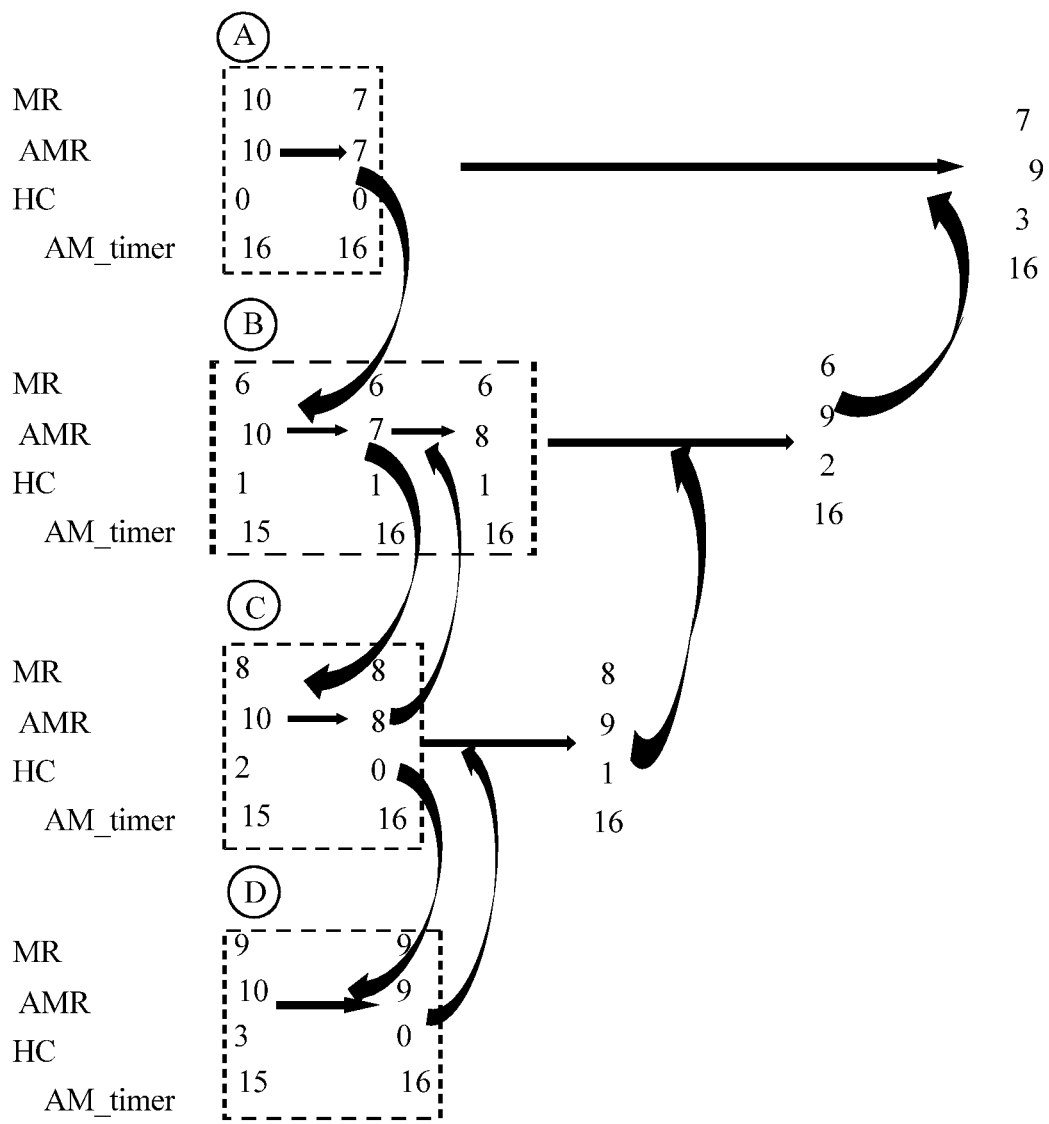
FIG. 5-b

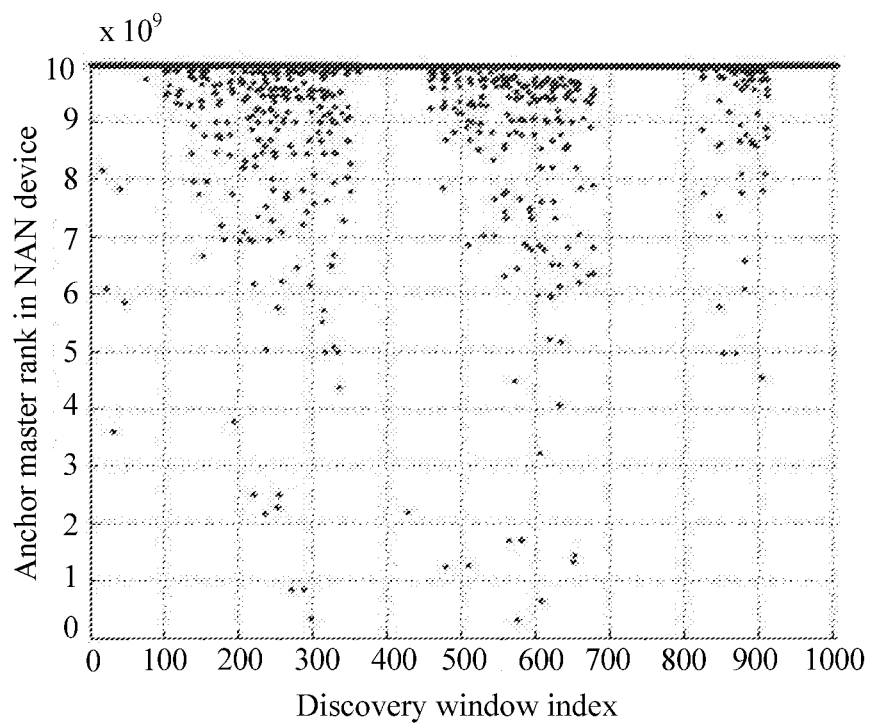
FIG. 6-a
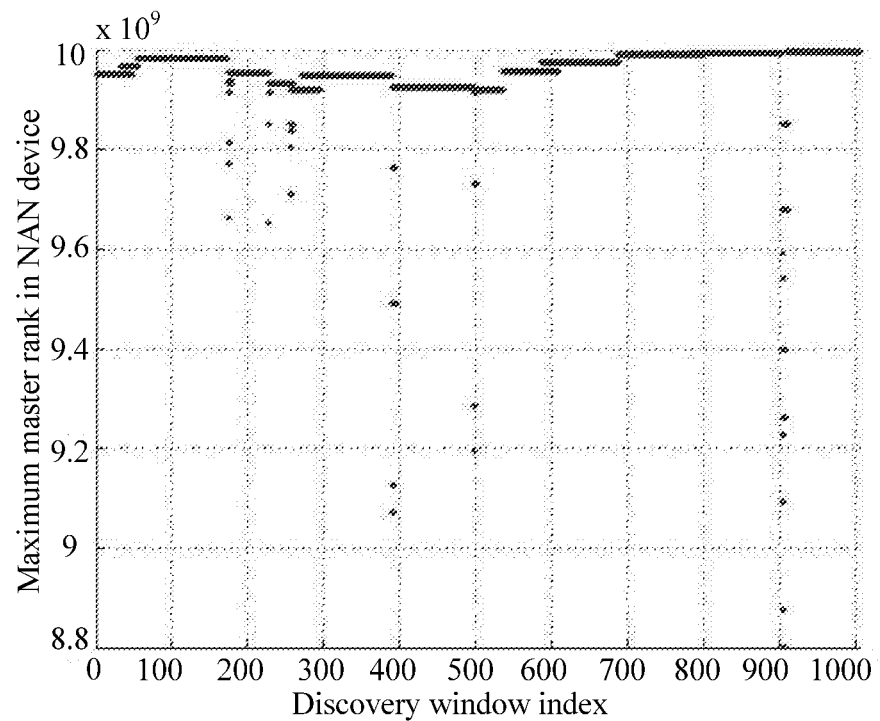
FIG. 6-b

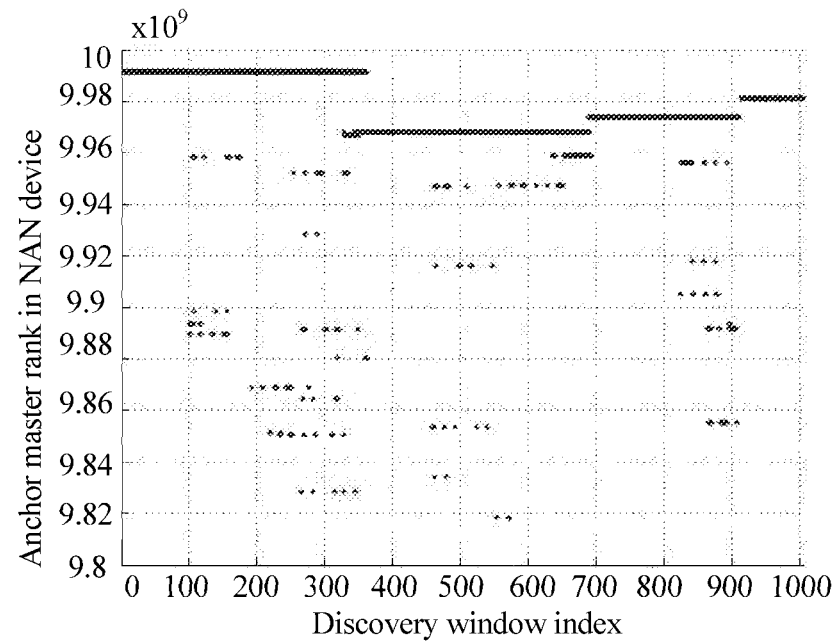
FIG. 6-c
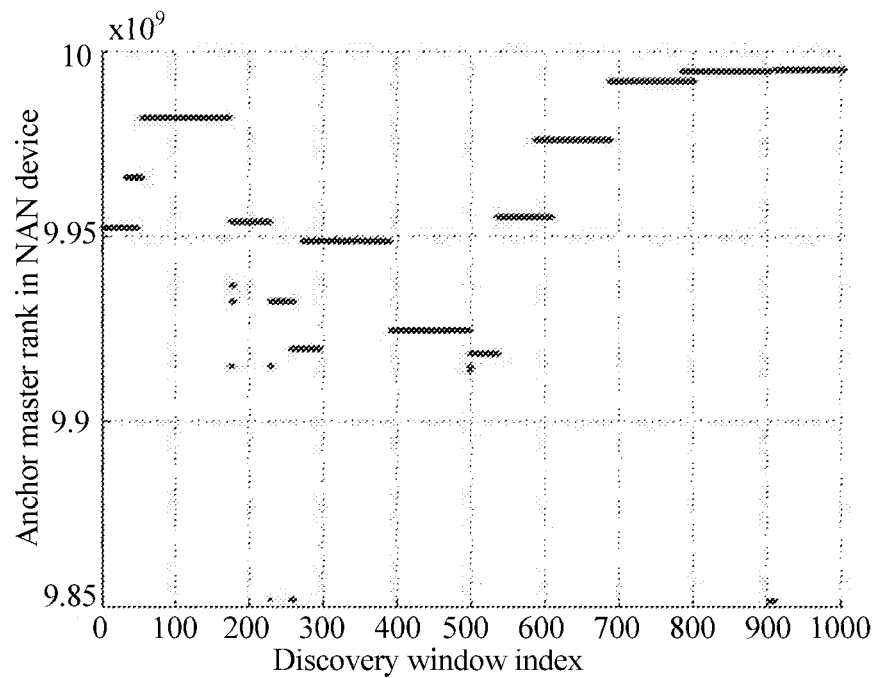
FIG. 6-d

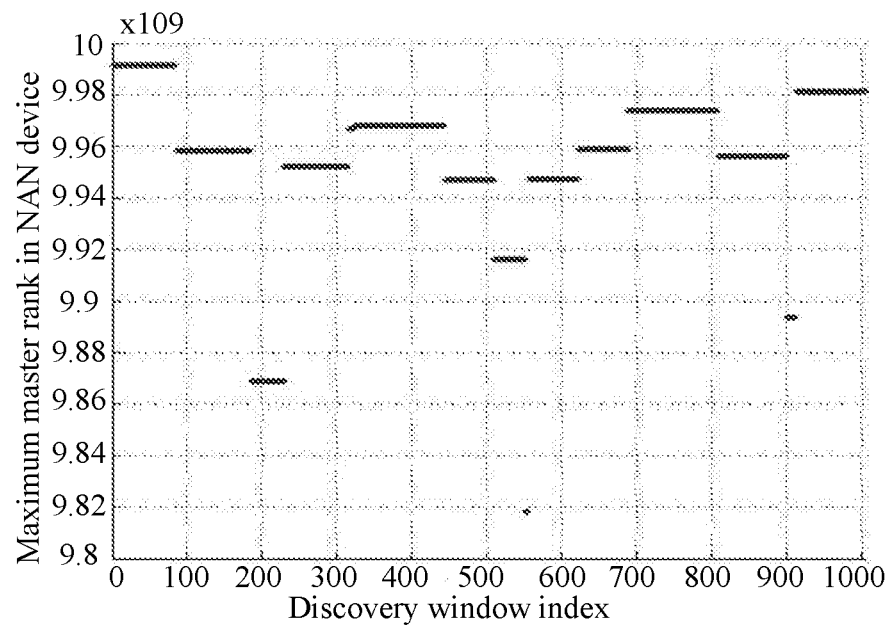
FIG. 6-e
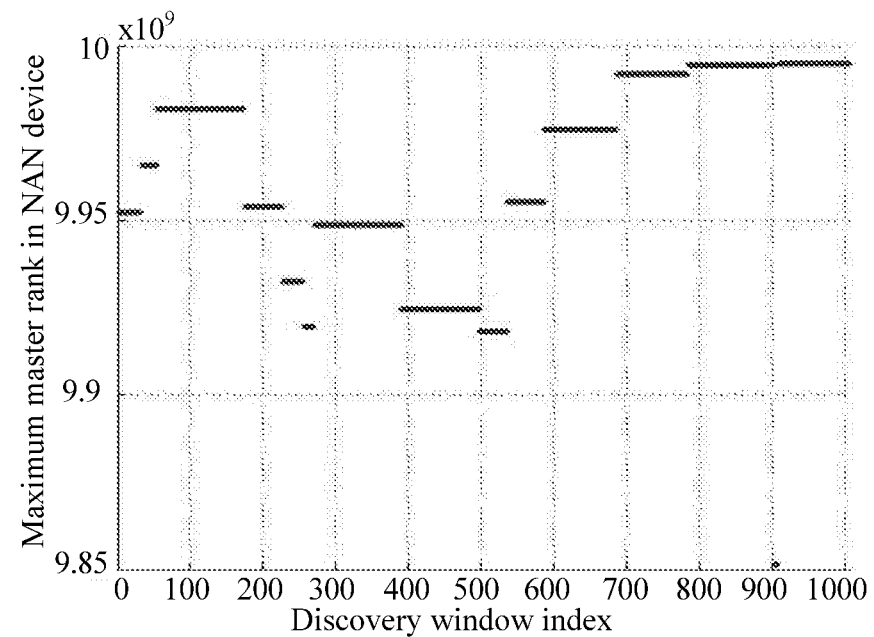
FIG. 6-f

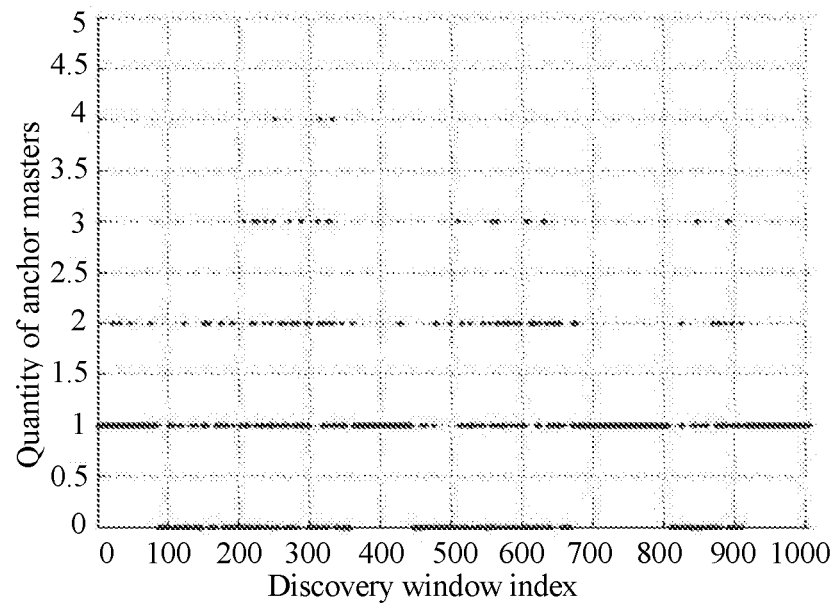
FIG. 6-g
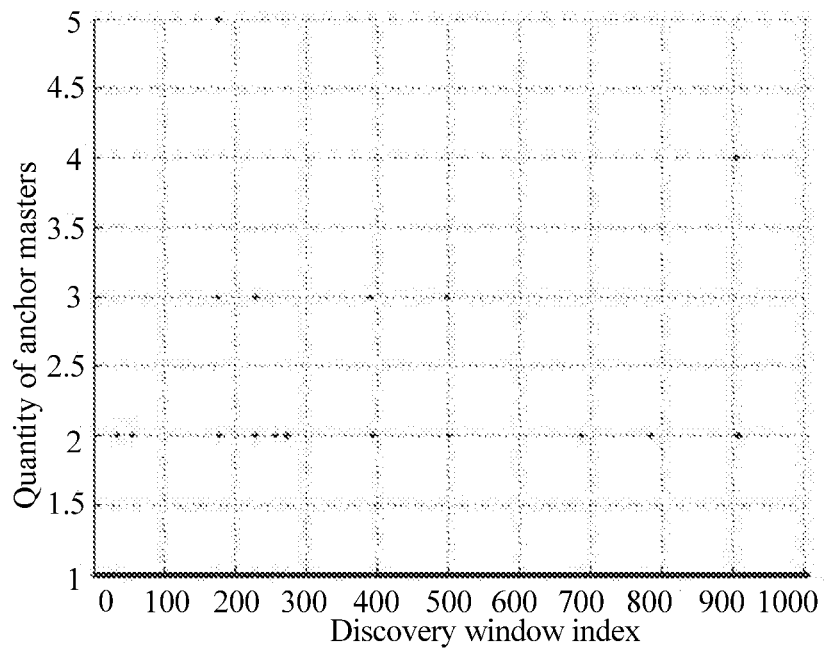
FIG. 6-h

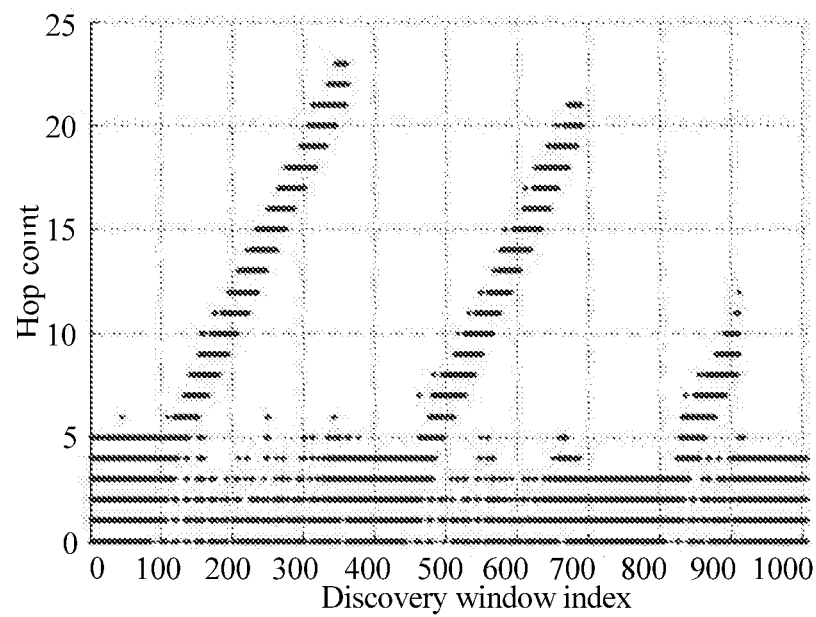
FIG. 6-i
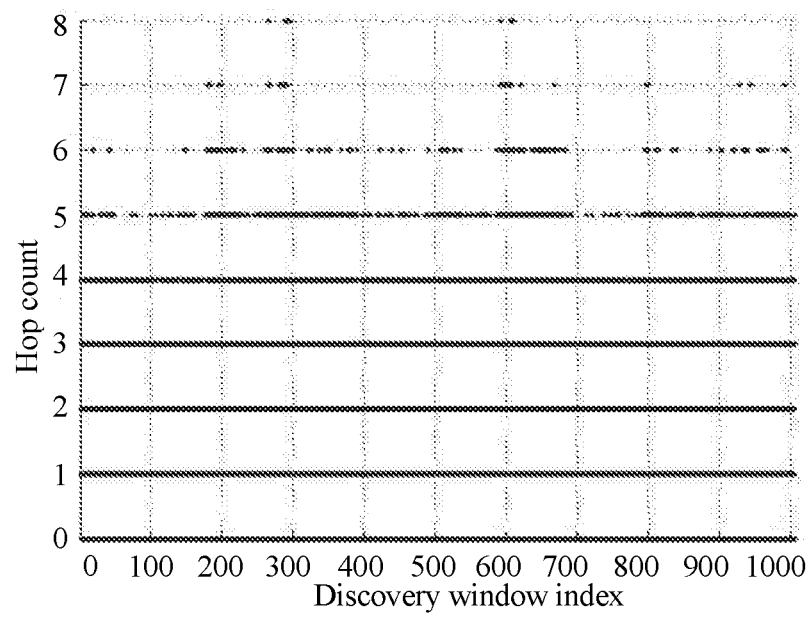
FIG. 6-j

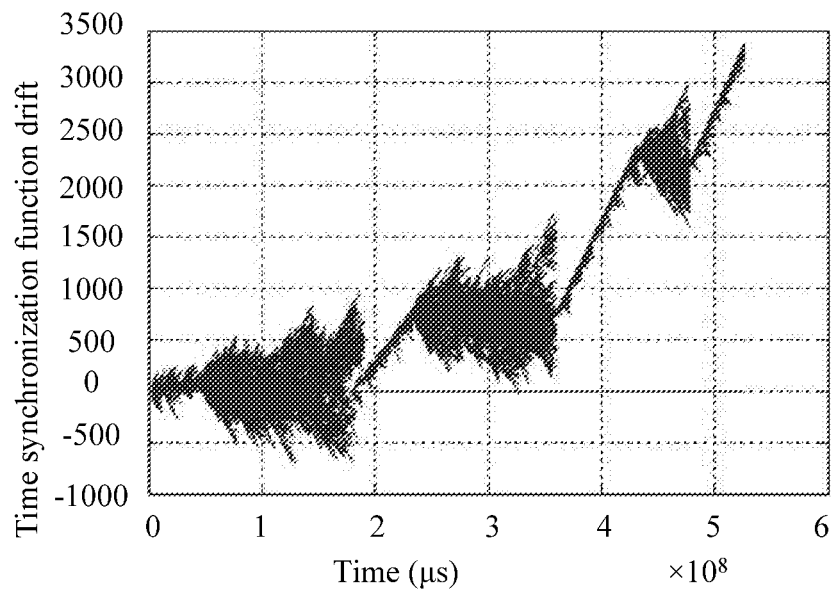
FIG. 6-k
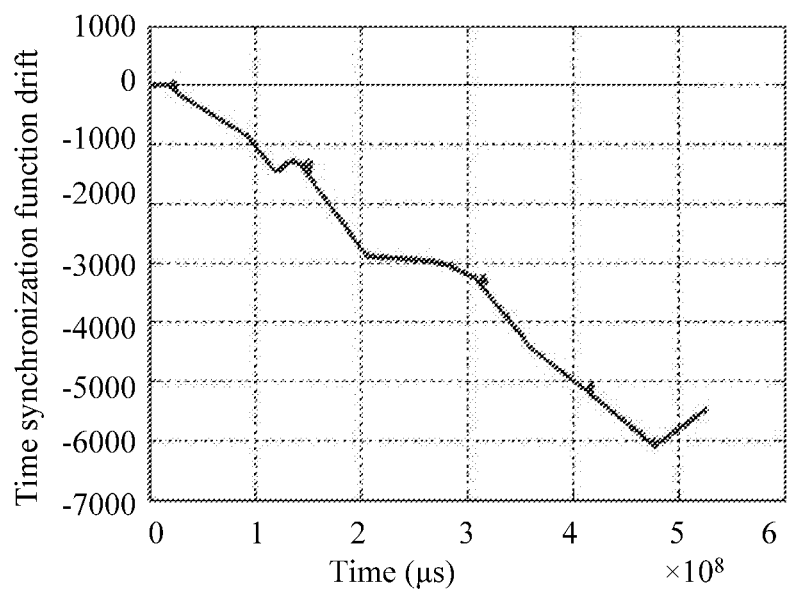
FIG. 6-l

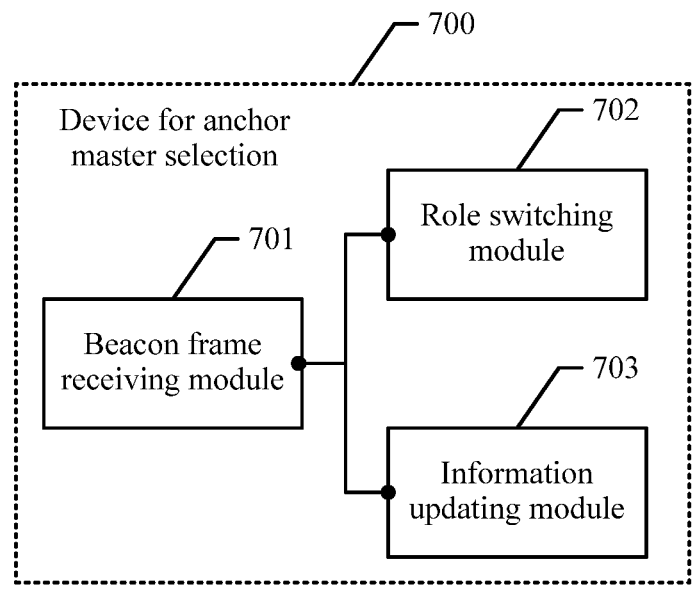
FIG. 7-a
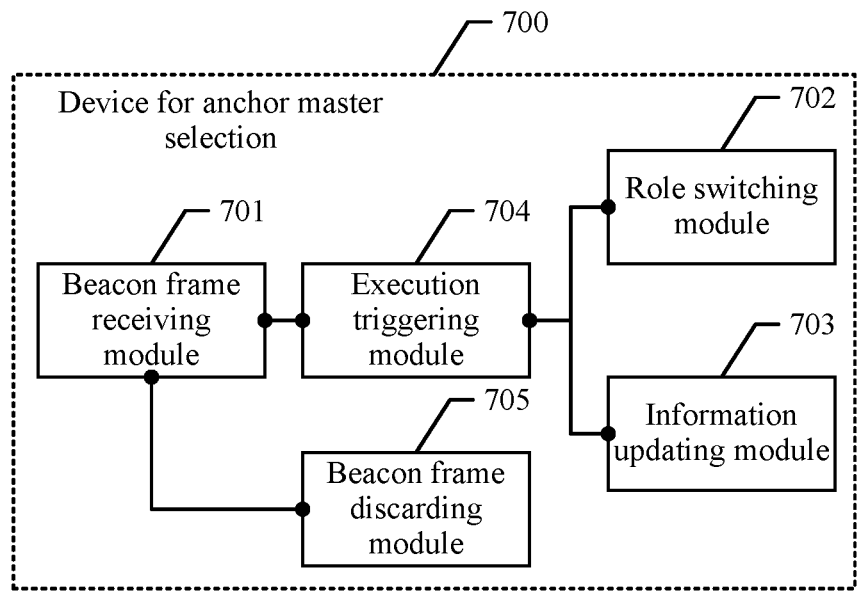
FIG. 7-b

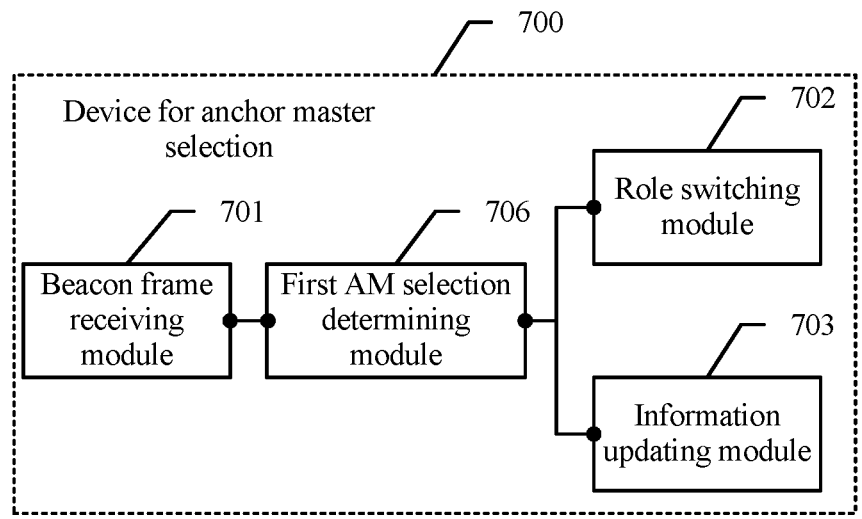
FIG. 7-c
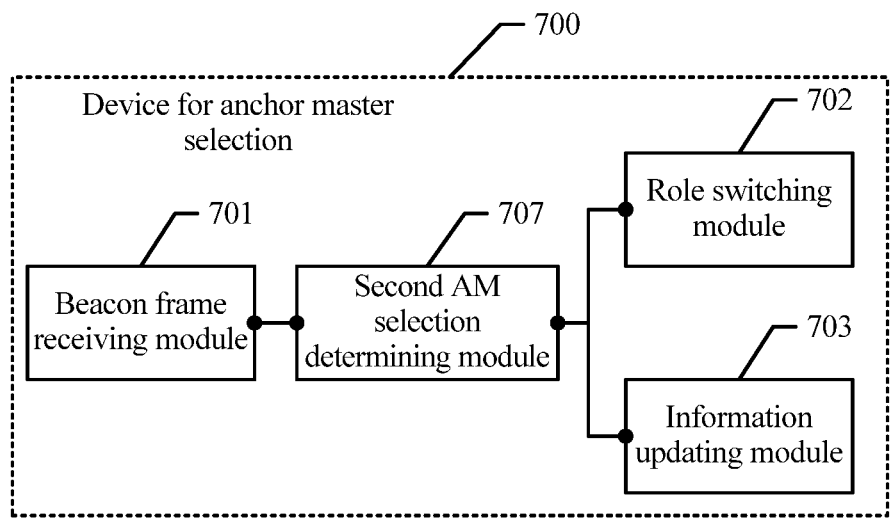
FIG. 7-d

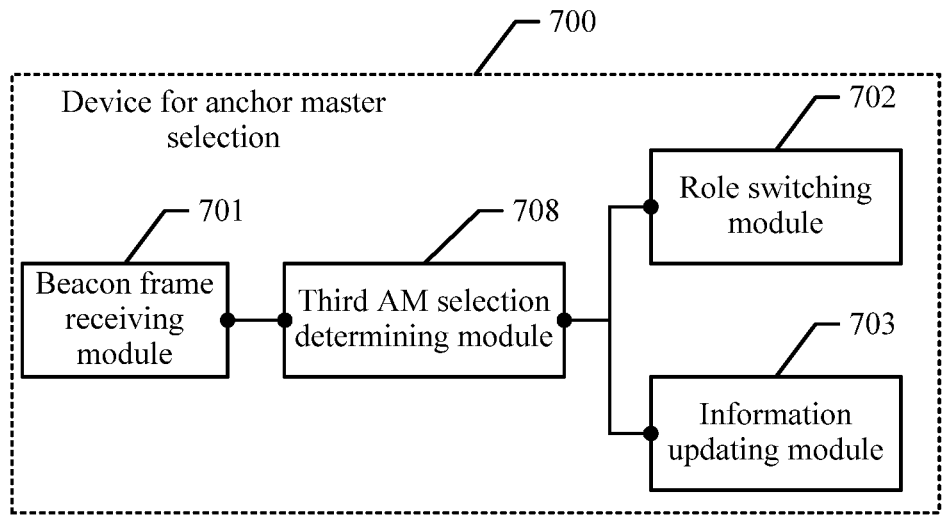
FIG. 7-e
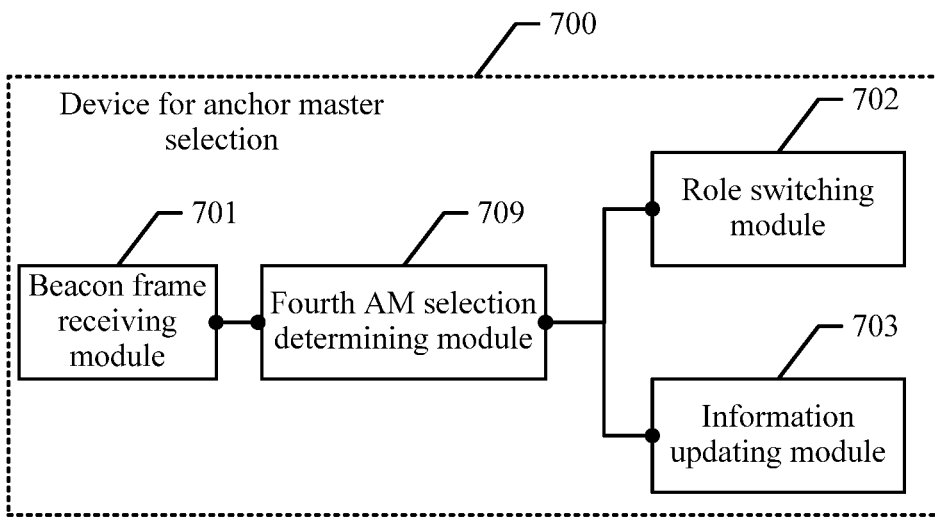
FIG. 7-f

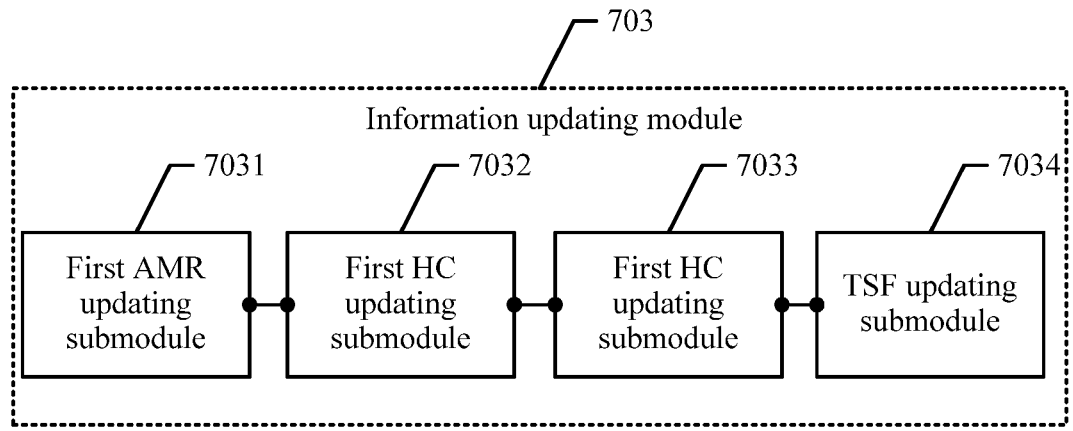
FIG. 7-g
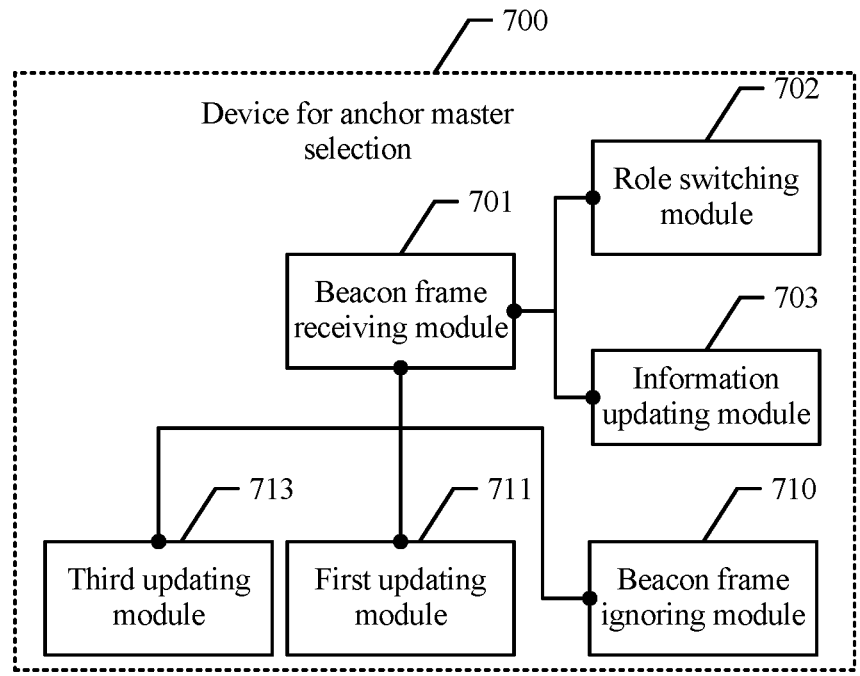
FIG. 7-h

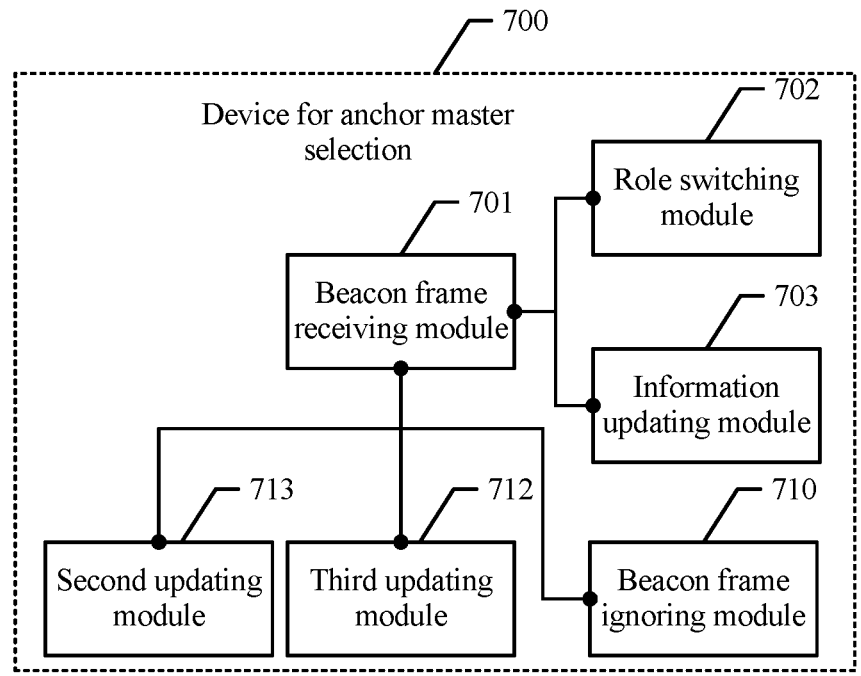
FIG. 7-i
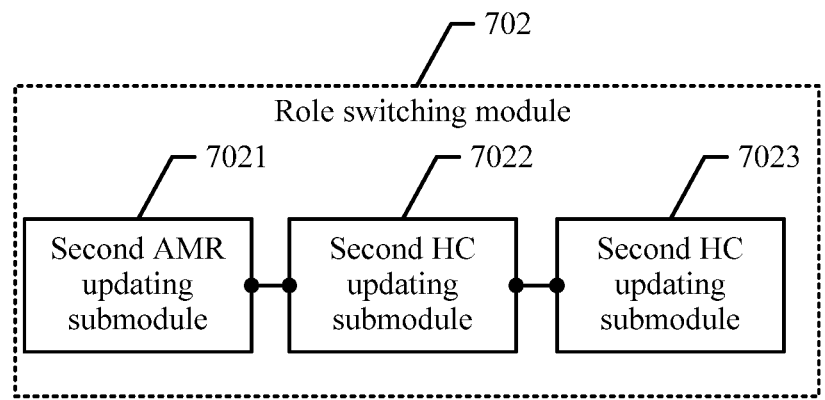
FIG. 7-j

METHOD AND DEVICE FOR ANCHOR MASTER SELECTION

CROSS-REFERENCE TO RELATED APPLICATIONS

This application is a continuation of International Application No. PCTPCT/CN2014/092816, filed on Dec. 2, 2014, which claims priority to Chinese Patent Application No. 201310634605.1, filed on Dec. 2, 2013 and Chinese Patent Application No. 201410301914.1, filed on Jun. 27, 2014, all of which are hereby incorporated by reference in their entireties.

TECHNICAL FIELD

The present invention relates to the field of communications technologies, and in particular, to a method and device for anchor master selection.

BACKGROUND

With coming of a mobile Internet era, a mainstream pattern in the Internet industry becomes social, localized, and mobile. Particularly, with popularization of a mobile device equipped with a Wireless Fidelity (Wireless-Fidelity, Wi-Fi) interface, social application of a device in neighbor awareness networking (Neighbor Awareness Networking, NAN) is becoming a hot spot in the industry.

A NAN network including multiple NAN devices is referred to as a NAN cluster (Cluster), and devices in a same NAN cluster have a same cluster identifier. Each device has its own attributes, including: a role (Role) and a state (State). A role includes two types: master (Master) and non-master (non-Master), and a state includes two types: synchronization (sync) and non-synchronization (non-sync). A device in the sync state is responsible for maintaining cluster synchronization. A master must be in the sync state, but a non-master may be in a sync or non-sync state. Each device further includes a master rank (Master Rank, MR), a master with a largest MR in the NAN cluster becomes an anchor master (Anchor Master, AM), and all other devices keep time synchronous with the AM, thereby ensuring synchronization of the entire NAN cluster.

A typical application scenario in the NAN cluster is that devices perform mutual service discovery before being associated. To perform service discovery between devices, a device in the NAN cluster must work on a social (social) channel of the NAN in a specific time period and maintain an awake (awake) state, for example, a social channel on a 2.4 GHz frequency channel is a channel 6. In some scenarios, the NAN is required to run in a background for a long time, and therefore a device in the NAN needs to perform energy saving control. Therefore, the device awakes only when a discovery window (Discovery Window, DW) arrives, and performs service discovery and cluster synchronization on a social channel; however, outside a DW, all devices except the master may be in a sleep state.

Because crystal oscillators inside different NAN devices have different frequencies, two devices must be often synchronized so as to ensure that there is no large deviation between system clocks of the two devices. To maintain synchronization of the NAN cluster, each master and each sync non-master send a synchronization beacon (Sync Beacon) frame in a DW, where the synchronization beacon frame includes AM information and time synchronization function (Time Synchronization Function, TSF) information, and the AM information includes: an anchor master rank (Anchor Master Rank, AMR), a hop count (Hop Count to Anchor Master, HC), and an anchor master beacon transmission time (Anchor Master Beacon Transmission Time, AMBTT). The AMR is an MR value of an AM, and each device in the NAN cluster records an AMR value.

Because a synchronization reference in the NAN cluster is the AM, that is, the master with the largest MR, and the MR changes randomly with time, when an MR of a device changes, the master with the largest MR in the NAN cluster also changes. When the MR of the device changes, an AM with a largest MR can be selected in time in the NAN cluster, which is crucial for maintaining synchronization of the NAN cluster. According to a current NAN specification draft, in a process of NAN cluster synchronization, an AMR value recorded in a device only becomes larger. However, when an MR of an AM becomes smaller, even if a device whose MR is an original AMR value does not exist, the original AMR value recorded in the device always exists in the NAN cluster and cannot be removed, and a recorded HC value becomes larger. According to an existing specification, when an HC in a received Sync Beacon frame exceeds a threshold, a device discards the Sync Beacon frame, that is, as time goes by, an HC becomes larger, devices in the entire NAN cluster discard all received Sync Beacon frames because the HC exceeds the threshold. Moreover, because the NAN cluster loses an AM, the entire NAN cluster crashes, and as a result, time synchronization between the devices cannot be implemented.

SUMMARY

Embodiments of the present invention provide a method and device for anchor master selection, which are used to maintain time synchronization between devices in a NAN cluster.

To resolve the foregoing technical problem, the following technical solutions are provided in the embodiments of the present invention:

According to a first aspect, an embodiment of the present invention provides a method for anchor master selection, including:

receiving, by a device, a neighbor awareness networking beacon NAN Beacon frame, where the NAN Beacon frame carries first AM information and first time synchronization function TSF information, and the first AM information includes: a first anchor master rank AMR, a first hop count HC, and a first anchor master beacon transmission time AMBTT; and the device records second AM information and second TSF information, where the second AM information comprises: a second AMR, a second HC, and a second AMBTT;

if the NAN Beacon frame is used for AM selection, when the first AMR is less than the second AMR, and a master rank MR of the device is greater than the first AMR, switching, by the device, a role of the device to AM; and if the NAN Beacon frame is used for AM selection, when the first AMR is less than the second AMR, and the MR of the device is less than the first AMR, updating, by the device according to the NAN Beacon frame, the second AM information and the second TSF information that are recorded in the device.

With reference to the first aspect, in a first possible implementation manner of the first aspect, the method further includes:

if the NAN Beacon frame is used for AM selection, when the first AMR is less than the second AMR, and the MR of the device is equal to the first AMR, switching, by the device, the role of the device to AM, or updating, by the device according to the NAN Beacon frame, the second AM information and the second TSF information that are recorded in the device.

With reference to the first aspect or the first possible implementation manner of the first aspect, in a second possible implementation manner of the first aspect, before the switching, by the device, the role of the device to AM, and the updating, by the device according to the NAN Beacon frame, the second AM information and the second TSF information that are recorded in the device, the method further includes:

if the first HC is less than or equal to the hop count threshold, triggering, by the device, execution of the step of switching, by the device, the role of the device to AM, or triggering, by the device, execution of the step of updating, by the device, according to the NAN Beacon frame, the second AM information and the second TSF information that are recorded in the device.

With reference to the first aspect or the first or the second possible implementation manner of the first aspect, in a third possible implementation manner of the first aspect, when the device is an AM, whether the NAN Beacon frame is used for AM selection is determined in the following manners:

if the first AMR is less than the second AMR, determining, by the device, that the NAN Beacon frame is not used for AM selection;

if the first AMR is greater than or equal to the second AMR, and if the first AMR is equal to a third AMR within a preset time period after updating of the second AMR starts, determining, by the device, that the NAN Beacon frame is not used for AM selection, where the third AMR is an AMR before the second AMR in the device is updated; and if the NAN Beacon frame does not meet a first condition, determining, by the device, that the NAN Beacon frame is used for AM selection, where the first condition is as follows: the first AMR is less than the second AMR, or the first AMR is equal to the third AMR within the preset time period.

With reference to the first aspect or the first or the second possible implementation manner of the first aspect, in a fourth possible implementation manner of the first aspect, when the device is an AM, whether the NAN Beacon frame is used for AM selection is determined in the following manners:

if the first AMR is less than the second AMR, determining, by the device, that the NAN Beacon frame is not used for AM selection;

if the first AMR is greater than or equal to the second AMR, and if the first AMBTT is less than the second AMBTT within a preset time period after updating of the second AMR starts, determining, by the device, that the NAN Beacon frame is not used for AM selection; and if the NAN Beacon frame does not meet a second condition, determining, by the device, that the NAN Beacon frame is used for AM selection, where the second condition is as follows: the first AMR is less than the second AMR, or the first AMBTT is less than the second AMBTT within the preset time period.

With reference to the first aspect or the first or the second possible implementation manner of the first aspect, in a fifth possible implementation manner of the first aspect, when the device is not an AM, whether the NAN Beacon frame is used for AM selection is determined in the following manners:

if the first AMR is less than the second AMR within a preset time period after updating of the second AMR starts, determining, by the device, that the NAN Beacon frame is not used for AM selection;

if the first AMR is equal to a third AMR within the preset period time, determining, by the device, that the NAN Beacon frame is not used for AM selection, where the third AMR is an AMR before the second AMR in the device is updated; and if the NAN Beacon frame does not meet a third condition, determining, by the device, that the NAN Beacon frame is used for AM selection, where the third condition is as follows: the first AMR is less than the second AMR within the preset time period, or the first AMR is equal to the third AMR within the preset time period.

With reference to the first aspect or the first or the second possible implementation manner of the first aspect, in a sixth possible implementation manner of the first aspect, when the device is not an AM, whether the NAN Beacon frame is used for AM selection is determined in the following manners:

if the first AMR is less than the second AMR within a preset time period after updating of the second AMR starts, determining, by the device, that the NAN Beacon frame is not used for AM selection;

if the first AMBTT is less than the second AMBTT within the preset time period, determining, by the device, that the NAN Beacon frame is not used for AM selection; and if the NAN Beacon frame does not meet a fourth condition, determining, by the device, that the NAN Beacon frame is used for AM selection, where the fourth condition is as follows: the first AMR is less than the second AMR within the preset time period, or the first AMBTT is less than the second AMBTT within the preset time period.

With reference to the first aspect or the first, the second, the third, the fourth, the fifth, or the sixth possible implementation manner of the first aspect, in a seventh possible implementation manner of the first aspect, the method further includes:

if the NAN Beacon frame is used for AM selection, when the first AMR is greater than the second AMR, updating, by the device according to the NAN Beacon frame, the second AM information and the second TSF information that are recorded in the device.

With reference to the first aspect or the first, the second, the third, the fourth, the fifth, the sixth, or the seventh possible implementation manner of the first aspect, in an eighth possible implementation manner of the first aspect, the updating, by the device according to the NAN Beacon frame, the second AM information and the second TSF information that are recorded in the device includes:

updating, by the device, the second AMR value to the first AMR value;

updating, by the device, the second HC value to the first HC value plus 1;

if the NAN Beacon frame is sent by the AM, updating, by the device, the second AMBTT value to a value of a preset byte/preset bytes of the first TSF information; or if the NAN Beacon frame is not sent by the AM, updating, by the device, the second AMBTT value to the first AMBTT; and updating, by the device, a value of the second TSF information to a value of the first TSF information.

With reference to the first aspect or the first, the second, the third, the fourth, the fifth, the sixth, the seventh, or the eighth possible implementation manner of the first aspect, in a ninth possible implementation manner of the first aspect, the method further includes:

if the NAN Beacon frame is used for AM selection, when the first AMR is equal to the second AMR, if the first AMBTT is greater than the second AMBTT, or the first AMBTT is equal to the second AMBTT and the first HC is less than the second HC minus 1, updating, by the device according to the NAN Beacon frame, the second TSF information and some information or all information of the second AM information that are recorded in the device.

With reference to the ninth possible implementation manner of the first aspect, in a tenth possible implementation manner of the first aspect, if the NAN Beacon frame is used for AM selection, when the first AMR is equal to the second AMR, and the first AMBTT is greater than the second AMBTT, the updating, by the device according to the NAN Beacon frame, the second TSF information and some information or all information of the second AM information that are recorded in the device includes:

updating, by the device, the second HC value to the first HC value plus 1;

if the NAN Beacon frame is sent by the AM, updating, by the device, the second AMBTT value to the value of the preset byte/bytes of the first TSF information; or if the NAN Beacon frame is not sent by the AM, updating, by the device, the second AMBTT value to the first AMBTT; and updating, by the device, the value of the second TSF information to the value of the first TSF information; and if the NAN Beacon frame is used for AM selection, when the first AMR is equal to the second AMR, and when the first AMBTT is equal to the second AMBTT, and the first HC is less than the second HC minus 1, the updating, by the device according to the NAN Beacon frame, the second TSF information and some information or all information of the second AM information that are recorded in the device includes:

updating, by the device, the second HC value to the first HC value plus 1; and updating, by the device, the value of the second TSF information to the value of the first TSF information.

With reference to the first aspect or the first, the second, the third, the fourth, the fifth, the sixth, the seventh, or the eighth possible implementation manner of the first aspect, in an eleventh possible implementation manner of the first aspect, the method further includes at least one of the following steps:

if the NAN Beacon frame is used for AM selection, when the first AMR is equal to the second AMR, and the first HC is greater than or equal to the second HC, ignoring, by the device, the first AM information carried in the NAN Beacon frame;

if the NAN Beacon frame is used for AM selection, and the NAN Beacon frame is not sent by the AM, when the first AMR is equal to the second AMR, the first HC is equal to the second HC minus 1, and the first AMBTT is greater than the second AMBTT, updating, by the device, the second AMBTT value to the first AMBTT, and updating, by the device, the value of the second TSF information to the value of the first TSF information;

if the NAN Beacon frame is used for AM selection, and the NAN Beacon frame is sent by the AM, when the first AMR is equal to the second AMR, the first HC is equal to the second HC minus 1, and the value of the preset byte/bytes of the first TSF information is greater than the second AMBTT, updating, by the device, the second AMBTT value to the first AMBTT, and updating, by the device, the value of the second TSF information to the value of the first TSF information; and if the NAN Beacon frame is used for AM selection, when the first AMR is equal to the second AMR, and the first HC is less than the second HC minus 1, if the NAN Beacon frame is sent by the AM, updating, by the device, the second AMBTT value to the value of the preset byte/bytes of the first TSF information; or if the NAN Beacon frame is not sent by the AM, updating, by the device, the second AMBTT value to the first AMBTT, updating, by the device, the value of the second TSF information to the value of the first TSF information, and updating, by the device, the second HC value to the first HC value plus 1.

With reference to the first aspect or the first, the second, the third, the fourth, the fifth, the sixth, the seventh, the eighth, the ninth, the tenth, or the eleventh possible implementation manner of the first aspect, in a twelfth possible implementation manner of the first aspect, the method further includes:

when a difference obtained by subtracting the second AMBTT from the value of the second TSF information is greater than a preset transmission time threshold, switching, by the device, the role of the device to AM.

With reference to the first aspect or the first, the second, the third, the fourth, the fifth, the sixth, the seventh, the eighth, the ninth, the tenth, the eleventh, or the twelfth possible implementation manner of the first aspect, in a thirteenth possible implementation manner of the first aspect, when the device is not an AM, and the MR of the device is updated, the method further includes:

when an updated MR of the device is greater than the second AMR, switching, by the device, the role of the device to AM.

With reference to the first aspect or the first, the second, the third, the fourth, the fifth, the sixth, the seventh, the eighth, the ninth, the tenth, the eleventh, the twelfth, or the thirteenth possible implementation manner of the first aspect, in a fourteenth possible implementation manner of the first aspect, the switching, by the device, the role of the device to AM includes:

updating, by the device, the second AMR value to the MR value of the device;

updating, by the device, the second HC value to 0; and updating, by the device, the second AMBTT value to a value of a preset byte/preset bytes of the second TSF information.

With reference to the first aspect or the first, the second, the third, the fourth, the fifth, the sixth, the seventh, the eighth, the ninth, the tenth, the eleventh, the twelfth, or the thirteenth possible implementation manner of the first aspect, in a fifteenth possible implementation manner of the first aspect, the switching, by the device, the role of the device to AM includes:

updating, by the device, the second AMR value to the MR value of the device;

updating, by the device, the second HC value to 0; and updating, by the device, the second AMBTT value to 0x00000000.

With reference to the first aspect or the first, the second, the third, the fourth, the fifth, the sixth, the seventh, the eighth, the ninth, the tenth, the eleventh, the twelfth, the thirteenth, the fourteenth, or the fifteenth possible implementation manner of the first aspect, in a sixteenth possible implementation manner of the first aspect, when the device is an AM, the method further includes:

when the MR of the device is updated, maintaining, by the device, an AM role, and updating, by the device, the recorded second AMR to an updated MR value of the device.

According to a second aspect, an embodiment of the present invention provides a device for anchor master selection, where the device includes:

a Beacon frame receiving module, configured to receive a neighbor awareness networking beacon NAN Beacon frame, where the NAN Beacon frame carries first AM information and first time synchronization function TSF information, and the first AM information includes: a first anchor master rank AMR, a first hop count HC, and a first anchor master beacon transmission time AMBTT; and the device records second AM information and second TSF information, where the second AM information comprises: a second AMR, a second HC, and a second AMBTT;

a role switching module, configured to: if the NAN Beacon frame is used for AM selection, when the first AMR is less than the second AMR, and a master rank MR of the device is greater than the first AMR, switch a role of the device to AM; and an information updating module, configured to: if the NAN Beacon frame is used for AM selection, when the first AMR is less than the second AMR, and the MR of the device is less than the first AMR, update, according to the NAN Beacon frame, the second AM information and the second TSF information that are recorded in the device.

With reference to the second aspect, in a first possible implementation manner of the second aspect, the role switching module is further configured to: if the NAN Beacon frame is used for AM selection, when the first AMR is less than the second AMR, and the MR of the device is equal to the first AMR, switch the role of the device to AM; or the information updating module is further configured to: if the NAN Beacon frame is used for AM selection, when the first AMR is less than the second AMR, and the MR of the device is equal to the first AMR, update, according to the NAN Beacon frame, the second AM information and the second TSF information that are recorded in the device.

With reference to the second aspect or the first possible implementation manner of the second aspect, in a second possible implementation manner of the second aspect, the device further includes:

an execution triggering module, configured to: if the first HC is less than or equal to the hop count threshold, trigger the role switching module to execute the step of switching the role of the device to AM, or trigger the information updating module to execute the step of updating, according to the NAN Beacon frame, the second AM information and the second TSF information that are recorded in the device.

With reference to the second aspect or the first or the second possible implementation manner of the second aspect, in a third possible implementation manner of the second aspect, when the device is an AM, the device further includes: a first AM selection determining module, configured to determine, in the following manners, whether the NAN Beacon frame is used for AM selection:

if the first AMR is less than the second AMR, determining that the NAN Beacon frame is not used for AM selection;

if the first AMR is greater than or equal to the second AMR, and if the first AMR is equal to a third AMR within a preset time period after updating of the second AMR starts, determining that the NAN Beacon frame is not used for AM selection, where the third AMR is an AMR before the second AMR in the device is updated; and if the NAN Beacon frame does not meet a first condition, determining that the NAN Beacon frame is used for AM selection, where the first condition is as follows: the first AMR is less than the second AMR, or the first AMR is equal to the third AMR within the preset time period.

With reference to the second aspect or the first or the second possible implementation manner of the second aspect, in a fourth possible implementation manner of the second aspect, when the device is an AM, the device further includes: a second AM selection determining module, configured to determine, in the following manners, whether the NAN Beacon frame is used for AM selection:

if the first AMR is less than the second AMR, determining that the NAN Beacon frame is not used for AM selection;

if the first AMR is greater than or equal to the second AMR, when the second AMR in the device is updated, if the first AMBTT is less than the second AMBTT within a preset time period after updating of the second AMR starts, determining that the NAN Beacon frame is not used for AM selection; and if the NAN Beacon frame does not meet a second condition, determining that the NAN Beacon frame is used for AM selection, where the first condition is as follows: the second AMR is less than the second AMR, or the first AMBTT is less than the second AMBTT within the preset time period.

With reference to the second aspect or the first or the second possible implementation manner of the second aspect, in a fifth possible implementation manner of the second aspect, when the device is not an AM, the device further includes: a third AM selection determining module, configured to determine, in the following manners, whether the NAN Beacon frame is used for AM selection:

if the first AMR is less than the second AMR within a preset time period after updating of the second AMR starts, determining that the NAN Beacon frame is not used for AM selection;

if the first AMR is equal to a third AMR within the preset period time, determining that the NAN Beacon frame is not used for AM selection, where the third AMR is an AMR before the second AMR in the device is updated; and if the NAN Beacon frame does not meet a third condition, determining that the NAN Beacon frame is used for AM selection, where the third condition is as follows: the first AMR is less than the second AMR within the preset time period, or the first AMR is equal to the third AMR within the preset time period.

With reference to the second aspect or the first or the second possible implementation manner of the second aspect, in a sixth possible implementation manner of the second aspect, when the device is not an AM, the device further includes: a fourth AM selection determining module, configured to determine, in the following manners, whether the NAN Beacon frame is used for AM selection:

if the first AMR is less than the second AMR within a preset time period after updating of the second AMR starts, determining that the NAN Beacon frame is not used for AM selection;

if the first AMBTT is less than the second AMBTT within the preset time period, determining that NAN Beacon frame is not used for AM selection; and if the NAN Beacon frame does not meet a fourth condition, determining that the NAN Beacon frame is used for AM selection, where the fourth condition is as follows: the first AMR is less than the second AMR within the preset time period, or the first AMR is equal to the third AMR within the preset time period.

With reference to the second aspect or the first, the second, the third, the fourth, the fifth, or the sixth possible implementation manner of the second aspect, in a seventh possible implementation manner of the second aspect, the information updating module is further configured to: if the NAN Beacon frame is used for AM selection, when the first AMR is greater than the second AMR, update, according to the NAN Beacon frame, the second AM information and the second TSF information that are recorded in the device.

With reference to the second aspect or the first, the second, the third, the fourth, the fifth, the sixth, or the seventh possible implementation manner of the second aspect, in an eighth possible implementation manner of the second aspect, the information updating module includes:

a first AMR updating submodule, configured to update the second AMR value to the first AMR value;

a first HC updating submodule, configured to update the second HC value to the first HC value plus 1;

a first AMBTT updating submodule, configured to: if the NAN Beacon frame is sent by the AM, update the second AMBTT value to a value of a preset byte/preset bytes of the first TSF information; or if the NAN Beacon frame is not sent by the AM, update the second AMBTT value to the first AMBTT; and a TSF updating submodule, configured to update a value of the second TSF information to a value of the first TSF information.

With reference to the second aspect or the first, the second, the third, the fourth, the fifth, the sixth, the seventh, or the eighth possible implementation manner of the second aspect, in a ninth possible implementation manner of the second aspect, the information updating module is further configured to: if the NAN Beacon frame is used for AM selection, when the first AMR is equal to the second AMR, if the first AMBTT is greater than the second AMBTT, or the first AMBTT is equal to the second AMBTT and the first HC is less than the second HC minus 1, update, according to the NAN Beacon frame, the second TSF information and some information or all information of the second AM information that are recorded in the device.

With reference to the ninth possible implementation manner of the second aspect, in a tenth possible implementation manner of the second aspect, if the NAN Beacon frame is used for AM selection, when the first AMR is equal to the second AMR, and the first AMBTT is greater than the second AMBTT, the information updating module includes:

the first HC updating submodule, configured to update the second HC value to the first HC value plus 1;

the first AMBTT updating submodule, configured to: if the NAN Beacon frame is sent by the AM, update the second AMBTT value to the value of the preset byte/bytes of the first TSF information; or if the NAN Beacon frame is not sent by the AM, update the second AMBTT value to the first AMBTT; and the TSF updating submodule, configured to update the value of the second TSF information to the value of the first TSF information; and if the NAN Beacon frame is used for AM selection, when the first AMR is equal to the second AMR, and when the first AMBTT is equal to the second AMBTT, and the first HC is less than the second HC minus 1, the information updating module includes:

the first HC updating submodule, configured to update the second HC value to the first HC value plus 1; and the TSF updating submodule, configured to update the value of the second TSF information to the value of the first TSF information.

With reference to the second aspect or the first, the second, the third, the fourth, the fifth, the sixth, the seventh, or the eighth possible implementation manner of the second aspect, in an eleventh possible implementation manner of the second aspect, the device further includes at least one of the following modules:

a Beacon frame ignoring module, configured to: if the NAN Beacon frame is used for AM selection, when the first AMR is equal to the second AMR, and the first HC is greater than or equal to the second HC, ignore the first AM information carried in the NAN Beacon frame;

a first updating module, configured to: if the NAN Beacon frame is used for AM selection, and the NAN Beacon frame is not sent by the AM, when the first AMR is equal to the second AMR, the first HC is equal to the second HC minus 1, and the first AMBTT is greater than the second AMBTT, update the second AMBTT value to the first AMBTT, and update the value of the second TSF information to the value of the first TSF information;

a second updating module, configured to: if the NAN Beacon frame is used for AM selection, and the NAN Beacon frame is sent by the AM, when the first AMR is equal to the second AMR, the first HC is equal to the second HC minus 1, and the value of the preset byte/bytes of the first TSF information is greater than the second AMBTT, update the second AMBTT value to the first AMBTT, and update the value of the second TSF information to the value of the first TSF information; and a third updating module, configured to: if the NAN Beacon frame is used for AM selection, when the first AMR is equal to the second AMR, and the first HC is less than the second HC minus 1, if the NAN Beacon frame is sent by the AM, update the second AMBTT value to the value of the preset byte/bytes of the first TSF information; or if the NAN Beacon frame is not sent by the AM, update the second AMBTT value to the first AMBTT, update the value of the second TSF information to the value of the first TSF information, and update the second HC value to the first HC value plus 1.

With reference to the second aspect or the first, the second, the third, the fourth, the fifth, the sixth, the seventh, the eighth, the ninth, the tenth, or the eleventh possible implementation manner of the second aspect, in a twelfth possible implementation manner of the second aspect, the role switching module is further configured to: when a difference obtained by subtracting the second AMBTT from the value of the second TSF information is greater than a preset transmission time threshold, switch the role of the device to AM.

With reference to the second aspect or the first, the second, the third, the fourth, the fifth, the sixth, the seventh, the eighth, the ninth, the tenth, the eleventh, or the twelfth possible implementation manner of the second aspect, in a thirteenth possible implementation manner of the second aspect, when the device is not an AM, and the MR of the device is updated, the role switching module is further configured to: when an updated MR of the device is greater than the second AMR, switch the role of the device to AM.

With reference to the second aspect or the first, the second, the third, the fourth, the fifth, the sixth, the seventh, the eighth, the ninth, the tenth, the eleventh, the twelfth, or the thirteenth possible implementation manner of the second aspect, in a fourteenth possible implementation manner of the second aspect, the role switching module includes:

a second AMR updating submodule, configured to update the second AMR value to the MR value of the device;

a second HC updating submodule, configured to update the second HC value to 0; and a second AMBTT updating submodule, configured to update the second AMBTT value to a value of a preset byte/preset bytes of the second TSF information.

With reference to the second aspect or the first, the second, the third, the fourth, the fifth, the sixth, the seventh, the eighth, the ninth, the tenth, the eleventh, the twelfth, or the thirteenth possible implementation manner of the second aspect, in a fifteenth possible implementation manner of the second aspect, the role switching module includes:

a second AMR updating submodule, configured to update the second AMR value to the MR value of the device;

a second HC updating submodule, configured to update the second HC value to 0; and a second AMBTT updating submodule, configured to update the second AMBTT value to 0x00000000.

With reference to the second aspect or the first, the second, the third, the fourth, the fifth, the sixth, the seventh, the eighth, the ninth, the tenth, the eleventh, the twelfth, the thirteenth, the fourteenth, or the fifteenth possible implementation manner of the second aspect, in a sixteenth possible implementation manner of the second aspect, when the device is an AM, the device further includes:

a role maintaining module, configured to: when the MR of the device is updated, maintain an AM role, and update the recorded second AMR to an updated MR value of the device.

It can be learned from the foregoing technical solutions that the embodiments of the present invention have the following advantages:

In the embodiments of the present invention, after a device receives a NAN Beacon frame, if the NAN Beacon frame is used for AM selection, when a first AMR included in the NAN Beacon frame is less than a second AMR recorded in the device, and an MR of the device is greater than the first AMR, the device switches a role of the device to AM; and if the NAN Beacon frame is used for AM selection, when the first AMR included in the NAN Beacon frame is less than the second AMR recorded in the device, and the MR of the device is less than the first AMR, the device updates, according to the NAN Beacon frame, second AM information and second TSF information that are recorded in the device. In a case in which the NAN Beacon frame received by the device can be used for AM selection, when the first AMR is less than the second AMR, and the MR of the device is greater than the first AMR, the role of the device is switched to AM, and the device whose role is switched to AM may overwrite an original AM in a NAN cluster, and therefore an original AMR in the NAN cluster is also overwritten; even if an MR of the AM becomes smaller, a new AM is selected quickly. Therefore, there is always an AM in the NAN cluster, and each device can record correct AM information, so as to avoid a crash of the entire NAN cluster, and ensure that time synchronization between devices can be implemented. When the MR value of the device is insufficient to make the device an AM, that is, when the first AMR is less than the second AMR recorded in the device, and the MR of the device is less than the first AMR, the device may update, according to the NAN Beacon frame, the second AM information and the second TSF information that are recorded in the device, and therefore the second AMR recorded in the device is also updated, and the original AMR in the NAN cluster is also overwritten; even if the MR of the AM becomes smaller, a new AM may be selected quickly. Therefore, there is always an AM in the NAN cluster, and each device can record the correct AM information, so as to avoid a crash of the entire NAN cluster and ensure that time synchronization between devices can be implemented.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings.

FIG. 5-$a$ is a schematic diagram of a process of updating AM information recorded in each device in a common implementation means;

FIG. 5-$b$ is a schematic diagram of a process of updating AM information recorded in each device according to an embodiment of the present invention;

FIG. 6-$a$ is a schematic diagram of statistics collection on an AMR value in a common method for AM selection;

FIG. 6-$b$ is a schematic diagram of statistics collection on an AMR value in a method for AM selection according to an embodiment of the present invention;

FIG. 6-$c$ is a schematic diagram of a magnified top of FIG. 6-$a$;

FIG. 6-$d$ is a schematic diagram of a magnified top of FIG. 6-$b$;

FIG. 6-$e$ is a schematic diagram of statistics collection on a maximum MR in a NAN network in a common method for AM selection;

FIG. 6-$f$ is a schematic diagram of statistics collection on a maximum MR in a NAN network in a method for AM selection according to an embodiment of the present invention;

FIG. 6-$g$ is a schematic diagram of statistics collection on the quantity of AMs in a NAN network in a common method for AM selection;

FIG. 6-$h$ is a schematic diagram of statistics collection on the quantity of AMs in a NAN network in a method for AM selection according to an embodiment of the present invention;

FIG. 6-$i$ is a schematic diagram of statistics collection on an HC in a NAN network in a common method for AM selection;

FIG. 6-$j$ is a schematic diagram of statistics collection on an HC in a NAN network in a method for AM selection according to an embodiment of the present invention;

FIG. 6-$k$ is a schematic diagram of statistics collection on a change of a TSF in a NAN network in a common method for AM selection;

FIG. 6-*l* is a schematic diagram of statistics collection on a change of a TSF in a NAN network in a method for AM selection according to an embodiment of the present invention;

FIG. 7-*a* is a schematic structural diagram of composition of a device for anchor master selection according to an embodiment of the present invention;

FIG. 7-*b* is a schematic structural diagram of composition of another device for anchor master selection according to an embodiment of the present invention;

FIG. 7-*c* is a schematic structural diagram of composition of another device for anchor master selection according to an embodiment of the present invention;

FIG. 7-*d* is a schematic structural diagram of composition of another device for anchor master selection according to an embodiment of the present invention;

FIG. 7-*e* is a schematic structural diagram of composition of another device for anchor master selection according to an embodiment of the present invention;

FIG. 7-*f* is a schematic structural diagram of composition of another device for anchor master selection according to an embodiment of the present invention;

FIG. 7-*g* is a schematic structural diagram of composition of an information updating module according to an embodiment of the present invention;

FIG. 7-*h* is a schematic structural diagram of composition of another device for anchor master selection according to an embodiment of the present invention;

FIG. 7-*i* is a schematic structural diagram of composition of another device for anchor master selection according to an embodiment of the present invention;

FIG. 7-*j* is a schematic structural diagram of composition of a role switching module according to an embodiment of the present invention.

DESCRIPTION OF EMBODIMENTS

Embodiments of the present invention provide a method and device for anchor master selection, which are used to maintain time synchronization between devices in a NAN cluster.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person skilled in the art based on the embodiments of the present invention shall fall within the protection scope of the present invention.

Terms such as "first", "second" in the specification, claims, and foregoing accompanying drawings of the present invention are used to distinguish between similar objects, and are not necessarily used to describe a specific sequence or order. It should be understood that, the terms are interchangeable under appropriate circumstances, and are merely used to distinguish objects with similar attributes when describing embodiments of the present invention. Furthermore, the terms "include" and "have" and any variations thereof are intended to cover a non-exclusive inclusion, so that a process, a method, a system, a product, or a device that includes a series of units, is not necessarily limited to expressly listed units, but may include other units that are not expressly listed or that are inherent to such process, method, product, or device.

Details are separately described in the following.

Figure 1:
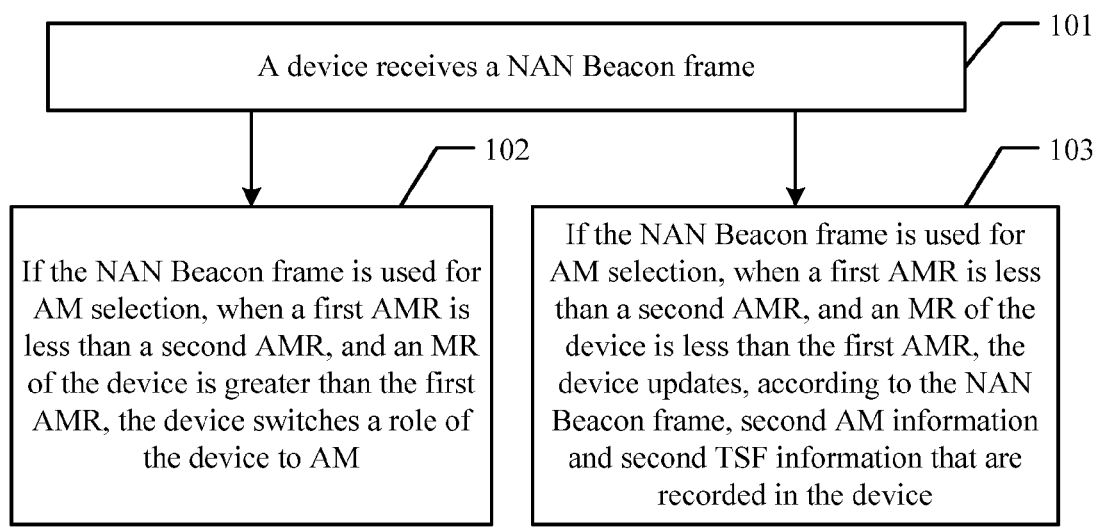
FIG. 1 is a schematic block diagram of a process of a method for anchor master selection according to an embodiment of the present invention.

An embodiment of a method for anchor master selection in the present invention may be applied to a device in a NAN cluster. Referring to FIG. 1, the method may include the following steps:

101. The device receives a neighbor awareness networking beacon (Neighbor Awareness Networking Beacon, NAN Beacon) frame.

The NAN Beacon frame carries first anchor master (Anchor Master, AM) information and first time synchronization function (Time Synchronization Function, TSF) information, and the first AM information includes: a first anchor master rank (Anchor Master Rank, AMR), a first hop count (Hop Count, HC), and a first anchor master beacon transmission time (Anchor Master Beacon Transmission Time, AMBTT).

In this embodiment of the present invention, devices in a same NAN cluster have a same cluster identifier. Each device has its own attributes, including: a role (Role) and a state (State). A role includes two types: a master (Master) and a non-master (non-Master), and a state includes two types: synchronization (sync) and non-synchronization (non-sync). A device in the sync state is responsible for maintaining cluster synchronization. A master must be in the sync state, but a non-master may be in a sync or non-sync state. Each device further includes a master rank (Master Rank, MR). In this embodiment of the present invention, the MR represents a degree of device intention to serve as a master, and the MR includes three parts:

Master Rank=Master Preference*2^56+Random Factor*2^48+MAC[5]*2^40+ . . . +MAC[0].

That is, the MR of each device includes an 8-bit master preference (Master Preference), an 8-bit random factor (Random Factor), and its own 48-bit medium access control (Medium Access Control, MAC) address. The random factor randomly changes once every 120 discovery windows (Discovery Window, DW). To prevent being traced, a local (Local) address is used as the MAC address of the NAN device, and each local MAC address remains unchanged for at least 30 minutes. According to an existing device role and state switching rule, a device with a larger MR becomes a master. A master with a largest MR is referred to as an AM, all other devices keep time synchronous with the AM, thereby ensuring synchronization of the entire NAN cluster. Synchronization of the NAN cluster indicates that TSFs of all devices in the cluster maintain the same. For TSF synchronization, all the devices need to be synchronized according to a clock of a same reference source, that is, the selected AM is used as the reference source, and a clock of another device maintains synchronization according to the clock of the AM. According to the foregoing description, because a reference of NAN synchronization is the AM, that is, the master with the largest MR, and the MR changes randomly with time, when an MR of a device changes, the master with the largest MR in the cluster also changes. The NAN cluster is a loose distributed network, and therefore when the MR of the device changes, a correct AM can be immediately selected in the NAN cluster, which is crucial for maintaining synchronization of the NAN cluster.

It should be noted that, synchronization of the NAN cluster is implemented by sending and receiving a NAN Beacon frame. In some embodiments of the present invention, the NAN Beacon frame received by the device may be specifically referred to as a synchronization beacon (Sync Beacon) frame. In some other embodiments, the NAN Beacon frame received by the device may be referred to as a discovery beacon (Discovery Beacon) frame. The master and a sync non-master separately send a Sync Beacon frame once in each DW, and the master sends a Discovery Beacon frame once every 100 time units (Time Unit, TU) outside a DW. The latter enables another device that has not joined the NAN cluster to learn about time when a next DW starts, so as to join the cluster. Currently, a start location of a DW specified in the NAN cluster is fixed, for example, a DW starts when a TSF is an integer multiple of 512 TUs. The Sync Beacon frame and the Discovery Beacon frame are frames with a similar frame structure, and have different names only because their sending locations are different. In addition to being used for synchronization, the device further performs role and state switching according to a received Sync Beacon frame. An example in which the NAN Beacon frame specifically is a Sync Beacon frame is described below.

In this embodiment of the present invention, because crystal oscillators inside different NAN devices have different frequencies, two devices must be often synchronized to ensure that no large deviation occurs between system clocks of the two devices. To maintain synchronization of the NAN cluster, each master and each sync non-master sends a Sync Beacon frame inside a DW, where the Sync Beacon frame includes AM information and a Time Stamp (eight bytes), and the Time Stamp is a TSF. To differentiate AM information carried in the NAN Beacon frame from AM information recorded in a device, which are two different pieces of AM information, in the following embodiments, the AM information carried in the NAN Beacon frame (which is also simply referred to as an AM carried in the frame) is referred to as "first AM information", and the AM information recorded in the device (which is also simply referred to as a recorded AM) is referred to as "second AM information". Likewise, an AMR, an HC, and an AMBTT that are included in the first AM information are respectively referred to as "a first AMR", "a first HC", and "a first AMBTT", and an AMR, an HC, and an AMBTT that are included in the second AM information are respectively referred to as "a second AMR", "a second HC", and "a second AMBTT". Likewise, in the following embodiments, TSF information carried in the NAN Beacon frame is referred to as "first TSF information", and TSF information recorded in the device is referred to as "second TSF information".

Specifically, the first AM information carried in the Sync Beacon frame may include the following contents:

a first AMR, that is, an MR value of an AM;

a first HC, that is, the quantity of hops from a current NAN device to the AM, where the HC of the AM is equal to 0, that is, it may be determined, according to whether the HC carried in the Sync Beacon frame is 0, whether the device is an AM. When the HC carried in the sent Sync Beacon frame is 0, the device that sends the Sync Beacon frame is the AM; or when the HC carried in the sent Sync Beacon frame is greater than 0, the device that sends the Sync Beacon frame is not the AM; and a first AMBTT, that is, a value of a preset byte/preset bytes of the TSF when the AM sends the Sync Beacon frame, where if the device receives two Sync Beacon frames with different AMBTTs, a Sync Beacon frame with a larger AMBTT is considered as the latest Sync Beacon frame.

In this embodiment of the present invention, the AMBTT is specified as follows: The AMBTT of the AM is 0, that is, it may be determined, according to whether the AMBTT carried in the Sync Beacon frame is 0, whether the device is the AM. When the AMBTT carried in the sent Sync Beacon frame is 0, the device that sends the Sync Beacon frame is the AM; or when the AMBTT carried in the sent Sync Beacon frame is greater than 0, the device that sends the Sync Beacon frame is not the AM. Therefore, when the device receives a Sync Beacon frame from the AM (which may be determined according to whether the AMBTT is 0 or the HC is 0), if the AMBTT needs to be updated, the last four bytes of a value of a Time Stamp field (TSF) of the Sync Beacon frame are set to an AMBTT recorded in the device; if the device receives a Sync Beacon frame from a non-AM, and if the AMBTT needs to be updated, the AMBTT value in the Sync Beacon frame is directly set to the AMBTT recorded in the device.

Figure 2:
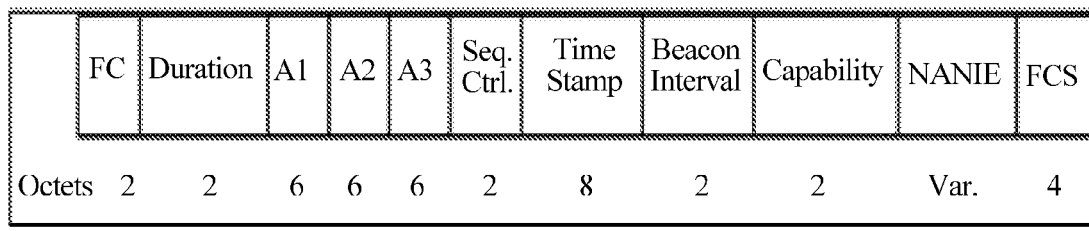
FIG. 2 is a schematic diagram of a frame structure of a NAN Beacon frame according to an embodiment of the present invention.

Referring to FIG. 2, FIG. 2 is a schematic diagram of a frame structure of a NAN Beacon frame according to an embodiment of the present invention. Each field is described as follows:

FC: Frame Control, a frame control field, which occupies two bytes (octets);

Duration: a duration field, which occupies two bytes;

A1-A3: Addresses 1-3, an addresses 1-3 field, which separately occupies six bytes;

Sequence Control: a sequence control field, which occupies two bytes;

Time Stamp: a time stamp field, which occupies eight bytes;

Beacon Interval: a beacon interval field, which occupies two bytes;

Capability: a capability field, which occupies two bytes;

NAN IE: NAN Information Element, a neighbor awareness networking information element, where var is a reserved word and is used to define a variable; and FCS: Frame Check Sequence, a frame check sequence, which occupies four bytes.

The NAN Beacon frame from each master and each sync non-master is a broadcast message, which can be obtained by listening by another device. As described in step 101 in this embodiment of the present invention, the device may receive the NAN Beacon frame.

It should be noted that in this embodiment of the present invention, a cluster device that receives a NAN Beacon frame compares AM information carried in the NAN Beacon frame with AM information recorded in the device, so as to determine whether to update the AM information and whether to synchronize with a Time Stamp in the NAN Beacon frame. As described above, clock information comes from the AM, and therefore synchronization is performed in the entire NAN cluster by using the AM as a reference.

It should be noted that in this embodiment of the present invention, after the device receives the NAN Beacon frame, the device may acquire the AM information carried in the frame from the NAN Beacon frame, and may determine, according to the AM information carried in the NAN Beacon frame, whether the NAN Beacon frame can be used for AM selection. For a case in which the NAN Beacon frame can be used for AM selection, subsequent steps may continue to be executed, and for a case in which the NAN Beacon frame is not used for AM selection, the first AM information carried in the NAN Beacon frame may be not processed. For example, the first AM information carried in the NAN Beacon frame is ignored. In this embodiment of the present invention, the device may determine whether the NAN Beacon frame is used for AM selection. In a case in which the NAN Beacon frame cannot be used for AM selection, the first AM information carried in the NAN Beacon frame is ignored, so that the first AM information carried in the NAN Beacon frame does not play a role in AM selection, which can avoid a problem that when an MR value of an AM in a NAN cluster becomes smaller, there is always an original AMR value in the NAN cluster and cannot be removed. An AM that really provides an AMR value may always exist in the NAN cluster, which can ensure a function of time synchronization between devices.

The device determines whether a received NAN Beacon frame is used for AM selection, selects a frame that can be used for AM selection from all received NAN Beacon frames, and performs subsequent processing on only the NAN Beacon frame that can be used for AM selection.

Specifically, in some embodiments of the present invention, for a difference in whether the device itself is an AM, the determining, by the device, whether the NAN Beacon frame is used for AM selection may be processed in different implementation manners, which are separately described in the following.

When the device is an AM, whether the NAN Beacon frame is used for AM selection is determined in the following manners:

A11. If the first AMR is less than the second AMR, the device determines that the NAN Beacon frame is not used for AM selection.

A12. If the first AMR is greater than or equal to the second AMR, and if the first AMR is equal to a third AMR within a preset time period after updating of the second AMR starts, the device determines that the NAN Beacon frame is not used for AM selection, where the third AMR is an AMR before the second AMR in the device is updated.

A13. If the NAN Beacon frame does not meet a first condition, the device determines that the NAN Beacon frame is used for AM selection, where the first condition is as follows: the first AMR is less than the second AMR, or the first AMR is equal to the third AMR within the preset time period.

In addition, when the device is an AM, whether the NAN Beacon frame is used for AM selection may be determined in the following manners:

A21. If the first AMR is less than the second AMR, the device determines that the NAN Beacon frame is not used for AM selection.

A22. If the first AMR is greater than or equal to the second AMR, and if the first AMBTT is less than a second AMBTT within a preset time period after updating of the second AMR starts, the device determines that the NAN Beacon frame is not used for AM selection.

A23. If the NAN Beacon frame does not meet a second condition, the device determines that the NAN Beacon frame is used for AM selection, where the second condition is as follows: the first AMR is less than the second AMR, or the first AMBTT is less than the second AMBTT within the preset time period.

In some embodiments of the present invention, the device may determine a value relationship between the first AMR and the second AMR, that is, the device may determine whether the first AMR is less than the second AMR, where the first AMR is an AMR carried in the NAN Beacon frame, and the second AMR is an AMR recorded in the device. When the device is an AM, the first AMR is less than the second AMR in steps A11 and A21, that is, the AMR recorded in the device is greater than the AMR carried in the NAN Beacon frame, and the first AM information carried in the NAN Beacon frame is ignored. In this case, the device may determine that the NAN Beacon frame is not used for AM selection.

When the device is an AM, the device determines that the first AMR is greater than or equal to the second AMR; and when the second AMR recorded in the device is updated, the AMR before updating of the second AMR in the device is the third AMR. If the device is within the preset time period after updating of the second AMR starts, the device determines whether the first AMR is equal to the third AMR. If the device is in another time outside the preset time period, the device does not need to execute step A12, that is, when the device is in another time outside the preset time period, the device does not need to determine whether the first AMR is equal to the third AMR. In step A12, only when three conditions are met at the same time: the device is an AM, the first AMR is greater than or equal to the second AMR, and the first AMR is equal to the third AMR within the preset time period after updating of the second AMR starts, the device may determine that the received NAN Beacon frame is not used for AM selection. In addition, in this embodiment of the present invention, a value of the preset time period needs to be determined according to a specific application scenario. For example, the value of the preset time period may be several DWs; or may not be described by using a DW. For example, the value of the preset time period is N ms or N TU/TUs.

After the device determines a condition in which the received NAN Beacon frame is not used for AM selection, in any case except that the NAN Beacon frame is not used for AM selection, the device may determine that the NAN Beacon frame is used for AM selection. Therefore, in step A13, "the first condition" is defined in a case in which the device is an AM; when the NAN Beacon frame does not meet the first condition, the device may determine that the received NAN Beacon frame can be used for AM selection. Specifically, the first condition is: (a) or (b):

(a). The first AMR is less than the second AMR.

(b). The first AMR is equal to the third AMR within the preset time period after the second AMR recorded in the device is updated.

That the NAN Beacon frame does not meet the first condition may refer to that the NAN Beacon frame neither meets (a) nor meets (b). That (a) is not met refers to that the first AMR is greater than or equal to the second AMR. That (b) is not met includes two cases: the device is not within the preset time period; and the device is within the preset time period, but the first AMR is not equal to the third AMR. If neither (a) nor (b) is met, it is considered that the NAN Beacon frame does not meet the first condition. Therefore, when the device is an AM and the NAN Beacon frame does not meet the first condition, the device may determine that the NAN Beacon frame is not used for AM selection.

When the device is an AM, the device determines that the first AMR is greater than or equal to the second AMR, and when the second AMR recorded in the device is updated, if the device is within the preset time period after updating of the second AMR starts, the device determines whether the first AMBTT is less than the second AMBTT; or if the device is in another time outside the preset time period, the device does not need to execute step A22, that is, when the device is in another time outside the preset time period, the device does not need to determine whether the first AMBTT is less than the second AMBTT. In step A22, only when three conditions are met at the same time: the device is an AM, the first AMR is greater than or equal to the second AMR, the first AMBTT is less than the second AMBTT within the preset time period after updating of the second AMR starts, the device may determine that the received NAN Beacon frame is not used for AM selection. In addition, in this embodiment of the present invention, a value of the preset time period needs to be determined according to a specific application scenario. For example, the value of the preset time period may be several DWs; or may not be described by using a DW. For example, the value of the preset time period is N ms or N TU/TUs.

After the device determines a condition in which the received NAN Beacon frame is not used for AM selection, in any case except that the NAN Beacon frame is not used for AM selection, the device may determine that the NAN Beacon frame is used for AM selection. Therefore, in step A23, "the second condition" is defined in a case in which the device is an AM; when the NAN Beacon frame does not meet the second condition, the device may determine that the received NAN Beacon frame can be used for AM selection. Specifically, the second condition is: (a) or (c):

(a). The first AMR is less than the second AMR.

(c). The first AMBTT is less than the second AMBTT within the preset time period after the second AMR recorded in the device is updated.

That the NAN Beacon frame does not meet the second condition may refer to that the NAN Beacon frame neither meets (a) nor meets (c). That (a) is not met refers to that the first AMR is greater than or equal to the second AMR. That (c) is not met includes two cases: the device is not within the preset time period; and the device is within the preset time period, but the first AMBTT is greater than or equal to the second AMBTT. If neither (a) nor (c) is met, it is considered that the NAN Beacon frame does not meet the second condition. Therefore, when the device is an AM and the NAN Beacon frame does not meet the second condition, the device may determine that the NAN Beacon frame is not used for AM selection.

For example, if the device itself is an AM, the first AMR value carried in the NAN Beacon frame received by the device is 7, the second AMR recorded in the device is 10, the AMR recorded in the device is 7 before being updated to 10, and the value of the preset time period is 5 DWs, the device separately performs determining according to conditions in the first condition: 7<10, that is, (a) is met, and the device determines that the NAN Beacon frame is not used for AM selection; if the current device is within 3 DWs, which is less than the value 5 DWs of the preset time period, and the first AMR is equal to the third AMR, (b) is met, and the device determines that the NAN Beacon frame is not used for AM selection.

When the device is not an AM, whether the NAN Beacon frame is used for AM selection is determined in the following manners:

B11. If the first AMR is less than the second AMR within a preset time period after updating of the second AMR starts, the device determines that the NAN Beacon frame is not used for AM selection.

B12. If the first AMR is equal to a third AMR within the preset period time, the device determines that the NAN Beacon frame is not used for AM selection, where the third AMR is an AMR before the second AMR in the device is updated.

B13. If the NAN Beacon frame does not meet a third condition, the device determines that the NAN Beacon frame is used for AM selection, where the third condition is as follows: the first AMR is less than the second AMR within the preset time period, or the first AMR is equal to the third AMR within the preset time period.

In addition, when the device is not an AM, whether the NAN Beacon frame is used for AM selection may be determined in the following manners:

B21. If the first AMR is less than the second AMR within a preset time period after updating of the second AMR starts, the device determines that the NAN Beacon frame is not used for AM selection.

B22. If the first AMBTT is less than a second AMBTT within the preset time period, the device determines that the NAN Beacon frame is not used for AM selection.

B23. If the NAN Beacon frame does not meet a fourth condition, the device determines that the NAN Beacon frame is used for AM selection, where the fourth condition is as follows: the first AMR is less than the second AMR within the preset time period, or the first AMBTT is less than the second AMBTT within the preset time period.

In some embodiments of the present invention, when the second AMR in the device is updated, it is first determined whether a time that the device is in is within the preset time period after the second AMR is updated. If the device is within the preset time period, the device may determine a value relationship between the first AMR and the second AMR, that is, the device may determine whether the first AMR is less than the second AMR, where the first AMR is an AMR carried in the NAN Beacon frame, and the second AMR is an AMR recorded in the device. When the device is not an AM, the first AMR is less than the second AMR in steps B11 and B21, that is, the AMR recorded in the device is greater than the AMR carried in the NAN Beacon frame, and the first AM information carried in the NAN Beacon frame is ignored. In this case, the device may determine that the NAN Beacon frame is not used for AM selection.

When the device is not an AM, and when the second AMR recorded in the device is updated, the AMR before the second AMR in the device is updated is the third AMR. If the device is within the preset time period after updating of the second AMR starts, the device determines whether the first AMR is equal to the third AMR; or if the device is in another time outside the preset time period, the device does not need to execute step B12, that is, when the device is in another time outside the preset time period, the device does not need to determine whether the first AMR is equal to the third AMR. In step B12, only when two conditions are met at the same time: the device is not an AM, and the first AMR is equal to the third AMR within the preset time period after updating of the second AMR starts, the device may determine that the received NAN Beacon frame is not used for AM selection. In addition, in this embodiment of the present invention, a value of the preset time period needs to be determined according to a specific application scenario. For example, the value of the preset time period may be several DWs; or may not be described by using a DW. For example, the value of the preset time period is N ms or N TU/TUs.

After the device determines a condition in which the received NAN Beacon frame is not used for AM selection, in any case except that the NAN Beacon frame is not used for AM selection, the device may determine that the NAN Beacon frame is used for AM selection. Therefore, in step B13, "the third condition" is defined in a case in which the device is not an AM; when the NAN Beacon frame does not meet the third condition, the device may determine that the received NAN Beacon frame can be used for AM selection. Specifically, the third condition is: (d) or (e):

(d). The first AMR is less than the second AMR within the preset time period.

(e). The first AMR is equal to the third AMR within the preset time period.

That the NAN Beacon frame does not meet the third condition may refer to that the NAN Beacon frame neither meets (d) nor meets (e). That (d) is not met includes two cases: the device is not within the preset time period; and the device is within the preset time period, but the first AMR is greater than or equal to the second AMR. That (e) is not met includes two cases: the device is not within the preset time period; and the device is within the preset time period, but the first AMR is not equal to the third AMR. If neither (d) nor (e) is met, it is considered that the NAN Beacon frame does not meet the third condition. Therefore, when the device is an AM and the NAN Beacon frame does not meet the third condition, the device may determine that the NAN Beacon frame is not used for AM selection.

When the device is not an AM, and when the second AMR recorded in the device is updated, the AMR before the second AMR in the device is updated is the third AMR. If the device is within the preset time period after updating of the second AMR starts, the device determines whether the first AMBTT is less than the second AMBTT; or if the device is in another time outside the preset time period, the device does not need to execute step B22, that is, when the device is in another time outside the preset time period, the device does not need to determine whether the first AMBTT is less than the second AMBTT. In step B22, only when two conditions are met at the same time: the device is not an AM, and the first AMBTT is less than the second AMBTT within the preset time period after updating of the second AMR starts, the device may determine that the received NAN Beacon frame is not used for AM selection. In addition, in this embodiment of the present invention, a value of the preset time period needs to be determined according to a specific application scenario. For example, the value of the preset time period may be several DWs; or may not be described by using a DW. For example, the value of the preset time period is N ms or N TU/TUs.

After the device determines a condition in which the received NAN Beacon frame is not used for AM selection, in any case except that the NAN Beacon frame is not used for AM selection, the device may determine that the NAN Beacon frame is used for AM selection. Therefore, in step B23, "the fourth condition" is defined in a case in which the device is not an AM; when the NAN Beacon frame does not meet the fourth condition, the device may determine that the received NAN Beacon frame can be used for AM selection. Specifically, the fourth condition is: (d) or (f):

(d). The first AMR is less than the second AMR within the preset time period.

(f). The first AMBTT is less than the second AMBTT within the preset time period.

That the NAN Beacon frame does not meet the fourth condition may refer to that the NAN Beacon frame neither meets (d) nor meets (f). That (d) is not met includes two cases: the device is not within the preset time period; and the device is within the preset time period, but the first AMR is greater than or equal to the second AMR. That (f) is not met includes two cases: the device is not within the preset time period; and the device is within the preset time period, but the first AMBTT is greater than or equal to the second AMBTT. If neither (d) nor (f) is met, it is considered that the NAN Beacon frame does not meet the fourth condition. Therefore, when the device is an AM and the NAN Beacon frame does not meet the fourth condition, the device may determine that the NAN Beacon frame is not used for AM selection.

For example, if the device itself is not an AM, the first AMR value carried in the NAN Beacon frame received by the device is 7, the second AMR recorded in the device is 10, the AMR recorded in the device is 7 before being updated to 10, and the value of the preset time period is 5 DWs, the device separately performs determining according to conditions in the second condition: if the current device is within 3 DWs, the device is still within the preset time period, and 7<10, that is, (d) is met, and the device determines that the NAN Beacon frame is not used for AM selection; and if the current device is in 3 DWs, which is less than the value 5 DWs of the preset time period, and the first AMR is equal to the third AMR, (e) is met, and the device determines that the NAN Beacon frame is not used for AM selection.

It should be noted that in this embodiment of the present invention, in a case in which the device determines that the NAN Beacon frame is not used for AM selection, the device may ignore the first AM information carried in the NAN Beacon frame. In a case in which the device determines that the NAN Beacon frame is used for AM selection, the device still needs to determine the value relationship between the first AMR and the second AMR, and determine a value relationship between an MR of the device and the first AMR. There are three results for the determining, by the device, of the value relationship between the first AMR and the second AMR: (1) The first AMR is greater than the second AMR. (2) The first AMR is equal to the second AMR. (3) The first AMR is less than the second AMR. There are three results for the determining, by the device, of the value relationship between the MR and the first AMR: (1) The MR is greater than the first AMR. (2) The MR is less than the first AMR. (3) The MR is equal to the first AMR. Only in a case in which the NAN Beacon frame is used for AM selection, step 102 and step 103 are separately executed according to a determining result.

102. If the NAN Beacon frame is used for AM selection, when a first AMR is less than a second AMR, and an MR of the device is greater than the first AMR, the device switches a role of the device to AM.

The device records second AM information, where the second AM information includes: the second AMR, a second HC, and the second AMBTT.

In this embodiment of the present invention, after the device receives the NAN Beacon frame, in a case in which the NAN Beacon frame is used for AM selection, when two conditions are met at the same time: the first AMR is less than the second AMR, and the MR of the device is greater than the first AMR, the device switches the role of the device to AM.

In some embodiments of the present invention, the device switches its own role in the NAN cluster to AM according to a role switching requirement in the NAN cluster when the two conditions are met at the same time: the first AMR is less than the second AMR, and the MR of the device is greater than the first AMR.

It should be noted that, in a case in which the NAN Beacon frame received by the device can be used for AM selection, when the first AMR is less than the second AMR, and the MR of the device is greater than the first AMR, the role of the device is switched to AM, and the device whose role is switched to AM may overwrite an original AM in the NAN cluster; therefore, an original AMR in the NAN cluster is also overwritten, even if an MR of the AM becomes smaller, there is always a device whose MR is an AMR value. Therefore, there is always an AM in the NAN cluster, which avoids a crash of the entire NAN cluster, and ensures that time synchronization between devices can be implemented.

Specifically, in step 102, that the device switches a role of the device to AM may specifically include the following steps:

C1. The device updates the second AMR value to the MR value of the device.

C2. The device updates the second HC value to 0.

C3. The device updates the second AMBTT value to a value of a preset byte/preset bytes of second TSF information.

Steps C1, C2, and C3 are for an update to the second AM information recorded in the device, so as to separately update the second AMR, the second HC, and the second AMBTT that are recorded in the device. For example, when a NAN device becomes an AM, the device sets AM information recorded in the device as follows: setting a second AMR of the device to its own MR; setting a second HC of the device to 0; and setting a second AMBTT of the device to 0x00000000. The value of the preset byte/bytes of the second TSF information may be a value of the last four bytes or a value of the last five bytes of the second TSF information, and the preset byte/bytes of the second TSF information may be set according to a specific application scenario.

103. If the NAN Beacon frame is used for AM selection, when the first AMR is less than the second AMR, and the MR of the device is less than the first AMR, the device updates, according to the NAN Beacon frame, second AM information and second TSF information that are recorded in the device.

In this embodiment of the present invention, after the device receives the NAN Beacon frame, in a case in which the NAN Beacon frame is used for AM selection, when two conditions are met at the same time: the first AMR is less than the second AMR, and the MR of the device is less than the first AMR, the device updates, according to the NAN Beacon frame, the second AM information and the second TSF information that are recorded in the device.

In some embodiments of the present invention, according to a requirement for updating AM information and TSF information in a NAN cluster, when the two conditions are met at the same time: the first AMR is less than the second AMR, and the MR of the device is less than the first AMR, the device updates, according to the NAN Beacon frame, the second AM information and the second TSF information that are recorded in the device.

It should be noted that, when the MR value of the device is insufficient to make the device an AM, that is, when the first AMR is less than the second AMR recorded in the device, and the MR of the device is less than the first AMR, the device may update, according to the NAN Beacon frame, the second AM information and the second TSF information that are recorded in the device, and therefore the second AMR recorded in the device is also updated, and the original AMR in the NAN cluster is also overwritten; even if the MR of the AM becomes smaller, there is always the device whose MR is the AMR value. Therefore, there is always an AM in the NAN cluster, which avoids a crash of the entire NAN cluster and ensures that time synchronization between devices can be implemented.

Specifically, in step 103, that the device updates, according to the NAN Beacon frame, second AM information and second TSF information that are recorded in the device may specifically include the following steps:

D1. The device updates the second AMR value to the first AMR value.

D2. The device updates the second HC value to the first HC value plus 1.

D3. If the NAN Beacon frame is sent by an AM, the device updates the second AMBTT value to a value of a preset byte/preset bytes of first TSF information; or if the NAN Beacon frame is not sent by an AM, the device updates the second AMBTT value to the first AMBTT.

D4. The device updates a value of the second TSF information to a value of the first TSF information.

Steps D1, D2, D3, and D4 are for an update on the second AM information and the second TSF information that are recorded in the device, so as to separately update the second AMR, the second HC, the second AMBTT, and the second TSF information that are recorded in the device.

It should be noted that in some other embodiments of the present invention, the method for anchor master selection may further include the following step:

E1. If the NAN Beacon frame is used for AM selection, when the first AMR is less than the second AMR, and the MR of the device is equal to the first AMR, the device switches the role of the device to AM; or E2. If the NAN Beacon frame is used for AM selection, when the first AMR is less than the second AMR, and the MR of the device is equal to the first AMR, the device updates, according to the NAN Beacon frame, the second AM information and the second TSF information that are recorded in the device.

Specifically, in step E1, that the device switches the role of the device to AM may specifically include the following steps:

updating, by the device, the second AMR value to the MR value of the device;

updating, by the device, the second HC value to 0; and updating, by the device, the second AMBTT value to the value of the preset byte/bytes of the second TSF information.

The foregoing description is for an update on all information of the second AM information recorded in the device, so as to separately update the second AMR, the second HC, and the second AMBTT that are recorded in the device. For example, when a NAN device becomes an AM, the device sets AM information recorded in the device as follows: setting a second AMR of the device to its own MR; setting a second HC of the device to 0; and setting a second AMBTT of the device to 0x00000000. The value of the preset byte/bytes of the second TSF information may be a value of the last four bytes or a value of the last five bytes of the second TSF information, and the preset byte/bytes of the second TSF information may be set according to a specific application scenario. For an implementation manner of performing role switching by the device, refer to description in the foregoing step 102, and details are not described herein again. A difference between step 102 and step E1 lies in an execution condition for switching the role of the device to AM by the device.

Specifically, in step E2, that the device updates, according to the NAN Beacon frame, second AM information and second TSF information that are recorded in the device may specifically include the following steps:

updating, by the device, the second AMR value to the first AMR value;

updating, by the device, the second HC value to the first HC value plus 1;

if the NAN Beacon frame is sent by the AM, updating, by the device, the second AMBTT value to the value of the preset byte/bytes of the first TSF information; or if the NAN Beacon frame is not sent by the AM, updating, by the device, the second AMBTT value to the first AMBTT; and updating, by the device, the value of the second TSF information to the value of the first TSF information.

The foregoing steps are for an update on the second AM information and the second TSF information that are recorded in the device, so as to separately update the second AMR, the second HC, the second AMBTT, and the second TSF information that are recorded in the device. For how to update, by the device, on the second AM information and the second TSF information that are recorded in the device, refer to description in the foregoing step 103, and details are not described herein again. A difference between step 103 and step E2 lies in an execution condition for updating, by the device, the second AM information and the second TSF information that are recorded in the device.

It can be learned, by using the foregoing description about this embodiment of the present invention, that after a device receives a NAN Beacon frame, if the NAN Beacon frame is used for AM selection, when a first AMR included in the NAN Beacon frame is less than a second AMR recorded in the device, and an MR of the device is greater than the first AMR, the device switches a role of the device to AM; or if the NAN Beacon frame is used for AM selection, when the first AMR included in the NAN Beacon frame is less than the second AMR recorded in the device, and an MR of the device is less than the first AMR, the device updates, according to the NAN Beacon frame, second AM information and second TSF information that are recorded in the device. In a case in which the NAN Beacon frame received by the device can be used for AM selection, when the first AMR is less than the second AMR, and the MR of the device is greater than the first AMR, the role of the device is switched to AM, and the device whose role is switched to AM may overwrite an original AM in a NAN cluster, and therefore an original AMR in the NAN cluster is also overwritten; even if an MR of the AM becomes smaller, there is always a device whose MR is an AMR value. Therefore, there is always an AM in the NAN cluster, which avoids a crash of the entire NAN cluster, and ensures that time synchronization between devices can be implemented. When the MR value of the device is insufficient to make the device an AM, that is, when the first AMR is less than the second AMR recorded in the device, and the MR of the device is less than the first AMR, the device may update, according to the NAN Beacon frame, the second AM information and the second TSF information that are recorded in the device, and therefore the second AMR recorded in the device is also updated, and the original AMR in the NAN cluster is also overwritten; even if the MR of the AM becomes smaller, there is always the device whose MR is the AMR value. Therefore, there is always an AM in the NAN cluster, which avoids a crash of the entire NAN cluster and ensures that time synchronization between devices can be implemented.

Figure 3:
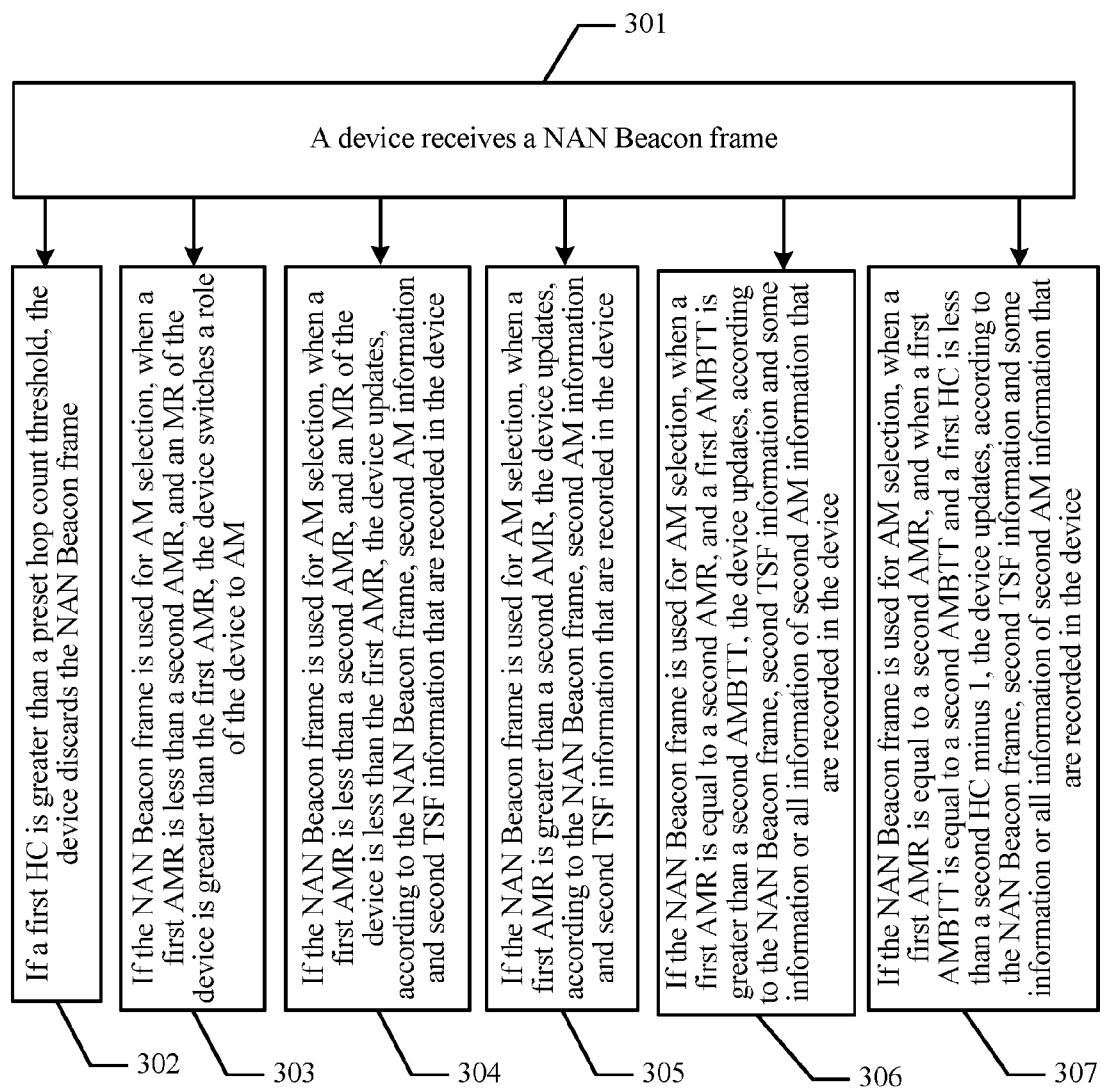
FIG. 3 is a schematic block flowchart of another method for anchor master selection according to an embodiment of the present invention.

Referring to FIG. 3, a method for anchor master selection provided in another embodiment of the present invention may specifically include the following steps:

301. A device receives a NAN Beacon frame.

The NAN Beacon frame carries first AM information and first TSF information, where the first AM information includes: a first AMR, a first HC, and a first AMBTT.

In this embodiment of the present invention, after the device receives the NAN Beacon frame, the device may acquire the first HC carried in the NAN Beacon frame from the NAN Beacon frame, and the device may determine a value relationship between the first HC and a preset hop count threshold. When the first HC is greater than the preset hop count threshold, step 302 is executed. When the first HC is less than or equal to the preset hop count threshold, the device may determine, according to the AM information carried in the NAN Beacon frame, whether the NAN Beacon frame can be used for AM selection. For a case in which the NAN Beacon frame can be used for AM selection, subsequent steps may continue to be executed, for example, execution of step 303 and step 304 is separately triggered.

It should be noted that in some other embodiments of the present invention, in addition to executing step 303 and step 304, the method for anchor master selection may further include the following steps:

if the NAN Beacon frame is used for AM selection, when the first AMR is less than the second AMR, and the MR of the device is equal to the first AMR, the device switches the role of the device to AM;

or if the NAN Beacon frame is used for AM selection, when the first AMR is less than the second AMR, and the MR of the device is equal to the first AMR, the device updates, according to the NAN Beacon frame, the second AM information and the second TSF information that are recorded in the device.

All information of the second AM information recorded in the device may be updated, and the second AMR, a second HC, and a second AMBTT that are recorded in the device are separately updated. For example, when a NAN device becomes an AM, the device sets AM information recorded in the device as follows:

setting a second AMR of the device to its own MR; setting a second HC of the device to 0; and setting a second AMBTT of the device to 0x00000000. A value of a preset byte/preset bytes of the second TSF information may be a value of the last four bytes or a value of the last five bytes of the second TSF information, and the preset byte/bytes of the second TSF information may be set according to a specific application scenario. For an update to the second AM information and the second TSF information that are recorded in the device, specifically, the second AMR, the second HC, the second AMBTT, and the second TSF information that are recorded in the device may be updated separately. For an update, by the device, on the second AM information and the second TSF information that are recorded in the device, reference is made to description in the foregoing step 103, and details are not described herein again.

It should be noted that, in this embodiment of the present invention, in a case in which the device determines that the NAN Beacon frame is not used for AM selection, the device may ignore the first AM information carried in the NAN Beacon frame. In a case in which the device determines that the NAN Beacon frame is used for AM selection, the device still needs to determine a value relationship between the first AMBTT and the second AMBTT. There are three results for the determining, by the device, of the value relationship between the first AMBTT and the second AMBTT: (1) The first AMBTT is greater than the second AMBTT. (2) The first AMBTT is equal to the second AMBTT. (3) The first AMBTT is less than the second AMBTT. The device further needs to determine a value relationship between the first HC and the second HC, and there are two results for the determining, by the device, of the value relationship between the first HC and the second HC: (1) The first HC is less than the second HC minus 1. (2) The first HC is greater than the second HC minus 1. Steps 305, 306, and 307 continue to be executed separately according to a difference of each determining result.

302. If a first HC is greater than a preset hop count threshold, the device discards the NAN Beacon frame, and if the NAN Beacon frame is discarded, another step described subsequently does not need to be executed.

When the first HC is greater than the preset hop count threshold, the NAN Beacon frame received by the device is an invalid frame, and the device may discard the NAN Beacon frame.

303. If the NAN Beacon frame is used for AM selection, when a first AMR is less than a second AMR, and an MR of the device is greater than the first AMR, the device switches a role of the device to AM.

304. If the NAN Beacon frame is used for AM selection, when the first AMR is less than the second AMR, and the MR of the device is less than the first AMR, the device updates, according to the NAN Beacon frame, second AM information and second TSF information that are recorded in the device.

305. If the NAN Beacon frame is used for AM selection, when the first AMR is greater than the second AMR, the device updates, according to the NAN Beacon frame, the second AM information and the second TSF information that are recorded in the device.

It should be noted that, a same action is executed by the device in step 304 and step 305, that is, the second AM information and the second TSF information that are recorded in the device are updated according to the NAN Beacon frame, but conditions for executing the action by the device are different in step 304 and step 305.

306. If the NAN Beacon frame is used for AM selection, when the first AMR is equal to the second AMR, and a first AMBTT is greater than a second AMBTT, the device updates, according to the NAN Beacon frame, the second TSF information and some information or all information of the second AM information that are recorded in the device.

There are two cases in which the device needs to update, according to the NAN Beacon frame, the information recorded in the device: A first case is that the second TSF information and some information of the second AM information are updated; a second case is that the second TSF information and all information of the second AM information are updated.

Specifically, in step 306, that the device updates, according to the NAN Beacon frame, the second TSF information and some information or all information of the second AM information that are recorded in the device may specifically include the following steps:

updating, by the device, the second HC value to the first HC value plus 1;

if the NAN Beacon frame is sent by the AM, updating, by the device, the second AMBTT value to a value of a preset byte/preset bytes of first TSF information; or if the NAN Beacon frame is not sent by the AM, updating, by the device, the second AMBTT value to the first AMBTT; and updating, by the device, a value of the second TSF information to a value of the first TSF information.

In addition, in some other embodiments of the present invention, in step 306, that the device updates, according to the NAN Beacon frame, the second TSF information and some information or all information of the second AM information that are recorded in the device may specifically include the following steps:

updating, by the device, the second AMR value to the first AMR value;

updating, by the device, the second HC value to the first HC value plus 1;

if the NAN Beacon frame is sent by the AM, updating, by the device, the second AMBTT value to the value of the preset byte/bytes of the first TSF information; or if the NAN Beacon frame is not sent by the AM, updating, by the device, the second AMBTT value to the first AMBTT; and updating, by the device, the value of the second TSF information to the value of the first TSF information.

It should be noted that, a difference between the two implementation manners lies in whether the second AMR value recorded in the device needs to be updated. Specifically, one of the two implementation manners may be selected according to an application scenario.

307. If the NAN Beacon frame is used for AM selection, when the first AMR is equal to the second AMR, and when the first AMBTT is equal to the second AMBTT, and the first HC is less than a second HC minus 1, the device updates, according to the NAN Beacon frame, the second TSF information and some information or all information of the second AM information that are recorded in the device.

There are two cases in which the device needs to update, according to the NAN Beacon frame, the information recorded in the device: A first case is that the second TSF information and some information of the second AM information are updated; a second case is that the second TSF information and all information of the second AM information are updated.

Specifically, in step 307, that the device updates, according to the NAN Beacon frame, the second TSF information and some information or all information of the second AM information that are recorded in the device may specifically include the following steps:

updating, by the device, the second HC value to the first HC value plus 1; and updating, by the device, the value of the second TSF information to the value of the first TSF information.

In addition, in some other embodiments of the present invention, in step 307, that the device updates, according to the NAN Beacon frame, the second TSF information and some information or all information of the second AM information that are recorded in the device may specifically include the following steps:

updating, by the device, the second AMR value to the first AMR value;

updating, by the device, the second HC value to the first HC value plus 1;

if the NAN Beacon frame is sent by the AM, updating, by the device, the second AMBTT value to the value of the preset byte/bytes of the first TSF information; or if the NAN Beacon frame is not sent by the AM, updating, by the device, the second AMBTT value to the first AMBTT; and updating, by the device, the value of the second TSF information to the value of the first TSF information.

It should be noted that, a difference between the two implementation manners lies in whether the second AMR value and the second AMBTT value that are recorded in the device need to be updated. Specifically, one of the two implementation manners may be selected according to an application scenario.

It should be noted that, in some embodiments of the present invention, one or more steps of step 302, and step 305 to step 307 may be specifically executed. For a specific execution situation, reference needs to be made to whether a condition required in each step is met, which is described only in an exemplary manner in this embodiment herein.

It can be learned, by using the foregoing description about this embodiment of the present invention, that after a device receives a NAN Beacon frame, if the NAN Beacon frame is used for AM selection, when a first AMR included in the NAN Beacon frame is less than a second AMR recorded in the device, and an MR of the device is greater than the first AMR, the device switches a role of the device to AM; or if the NAN Beacon frame is used for AM selection, when the first AMR included in the NAN Beacon frame is less than the second AMR recorded in the device, and an MR of the device is less than or equal to the first AMR, the device updates, according to the NAN Beacon frame, second AM information and second TSF information that are recorded in the device. In a case in which the NAN Beacon frame received by the device can be used for AM selection, when the first AMR is less than the second AMR, and the MR of the device is greater than the first AMR, the role of the device is switched to AM, and the device whose role is switched to AM may overwrite an original AM in a NAN cluster, and therefore an original AMR in the NAN cluster is also overwritten; even if an MR of the AM becomes smaller, a new AM is selected quickly. Therefore, there is always an AM in the NAN cluster, and each device can record correct AM information, which avoids a crash of the entire NAN cluster, and ensures that time synchronization between devices can be implemented. When the MR value of the device is insufficient to make the device an AM, that is, when the first AMR is less than the second AMR recorded in the device, and the MR of the device is less than or equal to the first AMR, the device may update, according to the NAN Beacon frame, the second AM information and the second TSF information that are recorded in the device, and therefore the second AMR recorded in the device is also updated, and the original AMR in the NAN cluster is also overwritten; even if the MR of the AM becomes smaller, a new AM may be selected quickly. Therefore, there is always an AM in the NAN cluster, and each device can record correct AM information, which avoids a crash of the entire NAN cluster and ensures that time synchronization between devices can be implemented.

Figure 4:
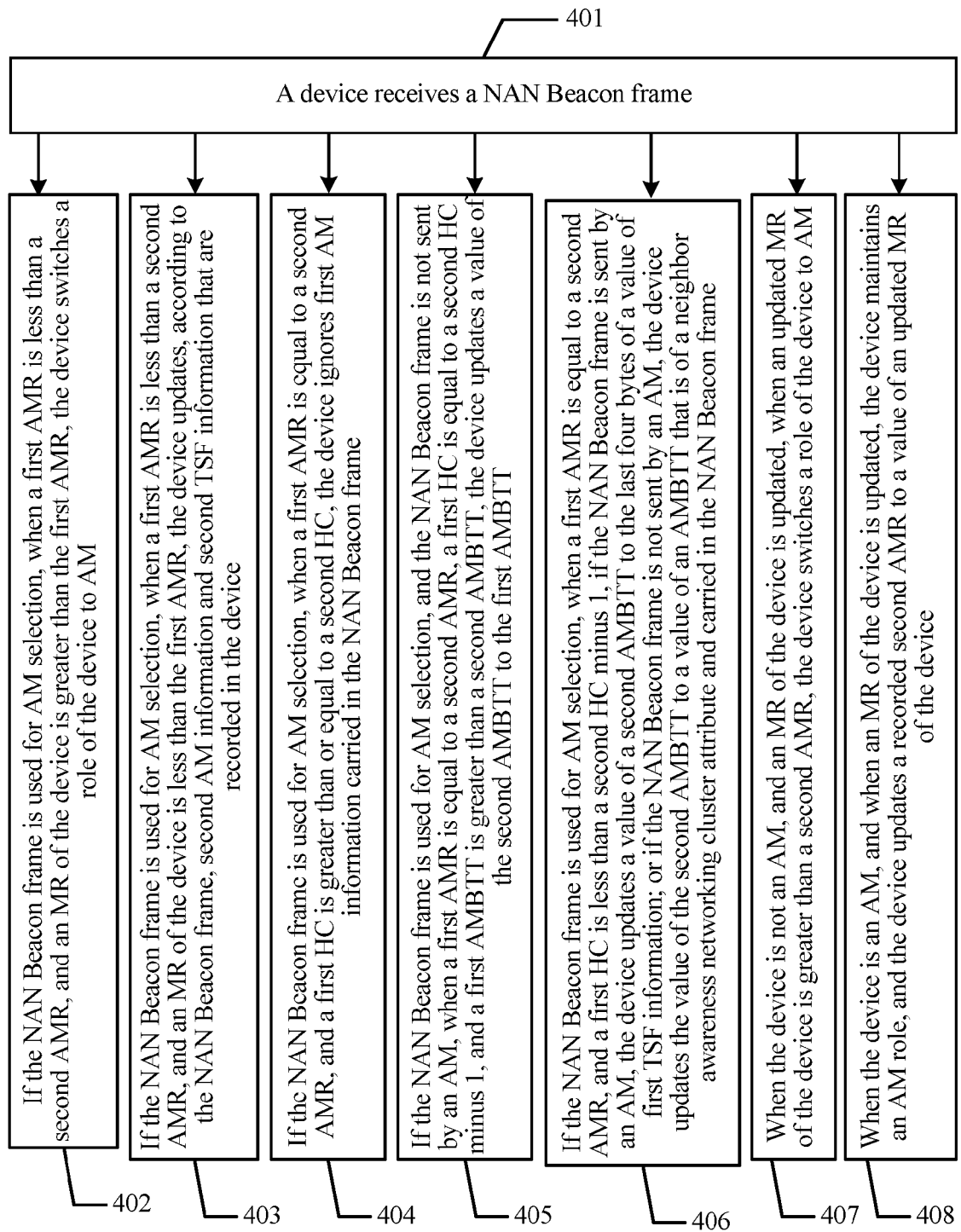
FIG. 4 is a schematic block flowchart of another method for anchor master selection according to an embodiment of the present invention.

Referring to FIG. 4, a method for anchor master selection provided in another embodiment of the present invention may specifically include the following steps:

401. A device receives a NAN Beacon frame.

The NAN Beacon frame carries first AM information and first TSF information, where the first AM information includes: a first AMR, a first HC, and a first AMBTT.

In this embodiment of the present invention, after the device receives the NAN Beacon frame, the device may determine, according to the AM information carried in the NAN Beacon frame, whether the NAN Beacon frame can be used for AM selection. For a case in which the NAN Beacon frame can be used for AM selection, subsequent steps may continue to be executed, for example, execution of step 402 and step 403 is separately triggered.

It should be noted that in this embodiment of the present invention, in a case in which the device determines that the NAN Beacon frame is not used for AM selection, the device may ignore the first AM information carried in the NAN Beacon frame. In a case in which the device determines that the NAN Beacon frame is used for AM selection, the device further needs to determine a value relationship between the first HC and a second HC. There are three results for the determining, by the device, whether the first HC is less than the second HC: (1) The first HC is greater than or equal to the second HC. (2) The first HC is equal to the second HC minus 1. (3) The first HC is less than the second HC minus 1. The device still needs to determine a value relationship between the first AMBTT and a second AMBTT, and there are three results for the determining, by the device, of the value relationship between the first AMBTT and the second AMBTT: (1) The first AMBTT is greater than the second AMBTT. (2) The first AMBTT is equal to the second AMBTT. (3) The first AMBTT is less than the second AMBTT. Steps 404, 405, and 406 are respectively executed subsequently according to a difference of each determining result.

In some other embodiments of the present invention, the device may further determine whether a difference obtained by subtracting the second AMBTT recorded in the device from a value of second TSF information is greater than a preset transmission time threshold, and determines, according to a determining result, whether to execute the following step:

When the difference obtained by subtracting the second AMBTT from the value of the second TSF information is greater than the preset transmission time threshold, switching, by the device, a role of the device to AM.

In addition, the switching, by the device, a role of the device to AM may specifically include the following steps:
updating, by the device, a second AMR value to an MR value of the device;
updating, by the device, the second HC value to 0; and
updating, by the device, the second AMBTT value to a value of a preset byte/preset bytes of the second TSF information.

When the MR of the device is updated, step 407 and step 408 may be respectively executed according to whether the device itself is an AM and a result of determining, by the device, whether an updated MR is greater than the recorded AMR.

402. If the NAN Beacon frame is used for AM selection, when a first AMR is less than a second AMR, and an MR of the device is greater than the first AMR, the device switches a role of the device to AM.

403. If the NAN Beacon frame is used for AM selection, when the first AMR is less than the second AMR, and the MR of the device is less than the first AMR, the device updates, according to the NAN Beacon frame, second AM information and second TSF information that are recorded in the device.

404. If the NAN Beacon frame is used for AM selection, when the first AMR is equal to the second AMR, and a first HC is greater than or equal to a second HC, the device ignores first AM information carried in the NAN Beacon frame.

405. If the NAN Beacon frame is used for AM selection, and the NAN Beacon frame is not sent by the AM, when the first AMR is equal to the second AMR, the first HC is equal to the second HC minus 1, and a first AMBTT is greater than a second AMBTT, the device updates the second AMBTT value to the first AMBTT, and device updates a value of the second TSF information to a value of first TSF information.

In addition, in some other embodiments of the present invention, step 405 may further be replaced by the following step:

If the NAN Beacon frame is used for AM selection, and the NAN Beacon frame is sent by an AM, when the first AMR is equal to the second AMR, the first HC is equal to the second HC minus 1, and a value of a preset byte/preset bytes of the first TSF information is greater than the second AMBTT, the device updates the second AMBTT value to the first AMBTT, and device updates the value of the second TSF information to the value of the first TSF information.

406. If the NAN Beacon frame is used for AM selection, when the first AMR is equal to the second AMR, and the first HC is less than the second HC minus 1, if the NAN Beacon frame is sent by an AM, the device updates the second AMBTT value to the value of the preset byte/bytes of the first TSF information; or if the NAN Beacon frame is not sent by an AM, the device updates the second AMBTT value to the first AMBTT, the device updates the value of the second TSF information to the value of the first TSF information, and the device updates the second HC value to the first HC value plus 1.

407. When the device is not an AM, and the MR of the device is updated, when an updated MR of the device is greater than the second AMR, the device switches the role of the device to AM.

408. When the device is an AM, and when the MR of the device is updated, the device maintains an AM role, and the device updates the recorded second AMR to an updated MR value of the device.

It should be noted that a same action is executed by the device in the foregoing steps 402 and 407, that is, the device switches the role of the device to AM, but conditions for executing the action by the device in the steps 402 and 407 are different. In this case, that the device switches the role of the device to AM may specifically include the following steps:

updating, by the device, the second AMR value to the MR value of the device;

updating, by the device, the second HC value to 0; and updating, by the device, the second AMBTT value to the value of the preset byte/bytes of the second TSF information.

It should be noted that in some embodiments of the present invention, one or more steps of step 404 to step 408 may be specifically executed. For a specific execution situation, reference needs to be made to whether a condition required in each step is met, which is described only in an exemplary manner in this embodiment herein.

It can be learned, by using the foregoing description about this embodiment of the present invention, that after a device receives a NAN Beacon frame, if the NAN Beacon frame is used for AM selection, when a first AMR included in the NAN Beacon frame is less than a second AMR recorded in the device, and an MR of the device is greater than the first AMR, the device switches a role of the device to AM; or if the NAN Beacon frame is used for AM selection, when the first AMR included in the NAN Beacon frame is less than the second AMR recorded in the device, and an MR of the device is less than or equal to the first AMR, the device updates, according to the NAN Beacon frame, second AM information and second TSF information that are recorded in the device. In a case in which the NAN Beacon frame received by the device can be used for AM selection, when the first AMR is less than the second AMR, and the MR of the device is greater than the first AMR, the role of the device is switched to AM, and the device whose role is switched to AM may overwrite an original AM in a NAN cluster, and therefore an original AMR in the NAN cluster is also overwritten; even if an MR of the AM becomes smaller, a new AM is selected quickly. Therefore, there is always an AM in the NAN cluster, and each device can record correct AM information, which avoids a crash of the entire NAN cluster, and ensures that time synchronization between devices can be implemented. When the MR value of the device is insufficient to make the device an AM, that is, when the first AMR is less than the second AMR recorded in the device, and the MR of the device is less than or equal to the first AMR, the device may update, according to the NAN Beacon frame, the second AM information and the second TSF information that are recorded in the device, and therefore the second AMR recorded in the device is also updated, and the original AMR in the NAN cluster is also overwritten; even if the MR of the AM becomes smaller, a new AM may be selected quickly. Therefore, there is always an AM in the NAN cluster, and each device can record correct AM information, which avoids a crash of the entire NAN cluster and ensures that time synchronization between devices can be implemented.

To better understand and implement the foregoing solutions in this embodiment of the present invention, a corresponding application scenario is used as an example for detailed description in the following.

A practical application scenario is used in the following to describe a common method for AM selection and the method for AM selection provided in this embodiment of the present invention, so as to prove an advantage of the method provided in this embodiment of the present invention in avoiding a crash of an entire NAN cluster and ensuring that time synchronization between devices is implemented.

It should be noted that as described in the following embodiment, a Sync Beacon frame is used as an example for description, rx* is used to represent a value carried in the Sync Beacon frame received by a device, and my* is used to represent a value of the device itself or a value recorded in the device.

In a current NAN specification draft, a method for performing AM selection is generally defined for each NAN device:

When a device receives a Sync Beacon frame, and when an rxHC of the Sync Beacon frame does not exceed a preset hop count threshold, the device performs processing according to the following algorithm; and if the rxHC exceeds the preset hop count threshold, the Sync Beacon frame is discarded. A common algorithm is described as follows:

if a recorded AMR value is higher than an AMR value carried in the Sync Beacon frame, discarding AM information carried in the Sync Beacon frame; and if the recorded AMR value is lower than the AMR value carried in the Sync Beacon frame, using, by the NAN device, the AMR, an HC plus 1, and an AMBTT that are in the Sync Beacon frame as recorded values in an AM information record of the device, that is, executing the following steps:

Update myAMR: myAMR=rxAMR, the device replaces the AMR value recorded in the device with the AMR value carried in the Sync Beacon frame;

Update myHC: myHC=rxHC+1;

Update myAMBTT: myAMBTT=rxAMBTT; and

Update myTSF: myTSF=rxTSF, that is, the device replaces a value of a TSF recorded in the device with a value of a Time Stamp field carried in the Sync Beacon frame.

If the recorded AMR value is equal to the AMR value in the Sync Beacon frame, the NAN device compares an HC recorded in the device with an HC in the Sync Beacon frame according to the following rules:

If the HC value in the Sync Beacon frame is greater than or equal to the recorded HC, the NAN device ignores the AM information in the Sync Beacon frame;

if the HC value in the Sync Beacon frame is equal to the recorded HC minus 1, and the AMBTT value in the Sync Beacon frame is greater than an AMBTT value in the recorded AM information, the NAN device uses the AMBTT value in the Sync Beacon frame as the AMBTT value recorded in the device; and if the HC value in the Sync Beacon frame is lower than the recorded HC minus 1, the NAN device uses the HC plus 1 in the Sync Beacon frame as the HC value recorded in the device, and updates the AMBTT in an AM information record of the NAN device according to the following rules:

if the received Sync Beacon frame is sent by an AM, the AMBTT in the current recorded AM information is set to a value of lower four bytes of a Time Stamp field in the received Sync Beacon frame; and if the received Sync Beacon frame is from a NAN Master or a Sync Non-Master device, the AMBTT in the current recorded AM information is set to a corresponding value of a NAN Cluster Attribute in the received Sync Beacon frame.

According to the common implementation manner described above, a case that occurs when an MR value of an AM becomes smaller is described by using an example in the following.

As shown in FIG. 5-a, FIG. 5-a is a schematic diagram of a process of updating AM information recorded in each device according to an embodiment of the present invention. As shown in FIG. 5-a, FIG. 5-a is a schematic diagram of a process of updating AM information recorded in each device according to an embodiment of the present invention.

It is assumed that initial MRs of four NAN devices A, B, C, and D are respectively 10, 6, 3, and 8, and therefore, A is an AM. Two neighboring nodes can mutually listen to and obtain a sent Sync Beacon frame, that is, A can receive a Sync Beacon frame sent by B, B can receive a Sync Beacon frame sent by A or C, C can receive a Sync Beacon frame sent by B or D, and D can receive a Sync Beacon frame sent by C.

Each device in a NAN cluster maintains a variable AM_timer, which represents a validity period of a current AMBTT. Each time the AMBTT is updated, a value of AM_timer is reset to 16, which represents that the validity period is 16 DWs. AM_timer maintained in a derive performs counting by subtraction, and when the AM_timer is decreased to 0, the device becomes an AM, where it is assumed that both MR updating and subtracting of AM_timer by 1 occur when a DW starts.

It is assumed that an MR of A is changed from 10 to 7 at a specific moment; in this case, a real AM in the NAN network is the device D. In this case, the device A still sets the device A itself to an AM, changes an AMR to 7, and then sends a Sync Beacon frame. After receiving the Sync Beacon frame, because the AMR therein is 7, which is less than 10 recorded in B, B does not update an AMR. Then, B sends a Sync Beacon frame, and after receiving the Sync Beacon frame, A finds that the AMR in the Sync Beacon frame is 10, which is greater than 7 recorded in A. Therefore, A updates its own state according to the Sync Beacon frame, that is, A sets the AMR recorded in A to 10, and sets an HC to 2. In this case, AMRs maintained in A and B are both 10, and HCs maintained in A and B are respectively 2 and 1; and C and D remain unchanged.

After 15 DWs, devices B, C, and D change themselves to AMs because AM_timer is changed to 0 (where maintained AMRs are changed to their own MRs respectively, and HCs are 0), and subsequently send Sync Beacon frames. A also sends a Sync Beacon frame. According to a received Sync Beacon frame, each device updates its own state according to the foregoing algorithm. In this case, AMRs recorded in A and B are 10, and HCs are respectively 2 and 3; and AMRs maintained in C and D are 8. In a following DW, C receives a Sync Beacon frame from B. Because an AMR (=10) of B is greater than an AMR (=8) of C, according to the foregoing algorithm, C updates a state according to the frame, where the recorded AMR is changed to 10, and an HC is changed to 4; and after one more DW, D receives a Sync Beacon frame from C. Likewise, D updates its own state according to the frame, where the recorded AMR is changed to 10, and an HC is changed to 5. So far, the AMRs maintained in the four devices are all 10, but HCs are respectively 4, 3, 4, and 5. Thereafter, the foregoing process is repeated. In this process, AMRs recorded in most devices in the network are 10, but HCs continuously increase until an MR of a device is changed to a value greater than 10. For example, if an MR of C is changed to 15, after several DWs, AMRs of all devices in the network are changed to 15, and HCs also increase with C as a center. In the foregoing process, an AMR value recorded in a device in the NAN network only becomes larger, even if a device whose MR is this value does not exist, there is always an old AMR value in the NAN network and cannot be removed, and a recorded HC value becomes larger. According to the foregoing content, when an HC in a received Sync Beacon frame exceeds a threshold, the Sync Beacon frame is discarded. This means that, as time goes by, HCs becomes larger, and devices in the entire NAN cluster discard received Sync Beacon frames because the HCs exceed the threshold, and at the same time, because an AM is lost in the NAN cluster, the entire NAN cluster crashes, and as a result, time synchronization between devices cannot be implemented.

The method for anchor master selection provided in this embodiment of the present invention is described by using an example in the following.

It should be noted that, as described in the following embodiment, a Sync Beacon frame is used as an example for description, rx* is used to represent a value carried in the Sync Beacon frame received by a device, and my* is used to represent a value of the device itself or a value recorded in the device.

In this embodiment of the present invention, the method for performing AM selection is defined as follows:

when an MR of a non-AM is updated, and a new MR is greater than an AMR recorded in the non-AM, the non-AM itself becomes an AM: myAMR=myMR, myHC=0, and myAMBTT=0; and when an MR of an AM device is changed, an AM identity is maintained, but the recorded AMR is changed to an updated value;

when the myAMBTT that exceeds a preset transmission time threshold (which is currently specified as 16 DWs) is not updated, the device itself becomes an AM: myAMR=myMR, myHC=0, and myAMBTT=0; and if a hop count value rxHC carried in the Sync Beacon frame exceeds a preset hop count threshold, the frame is discarded, where that the received Sync Beacon frame is not used for AM selection mainly includes the following cases:

(1) If the device is an AM, and the received Sync Beacon frame meets that rxAMR<myAMR, the Sync Beacon frame is not used for AM selection.

(2) In a preset time period after an AMR recorded in the device is changed (an AMR before updating is denoted as OldAMR), if the rxAMR in the received Sync Beacon frame is equal to the OldAMR of the device, or when rxAMR<myAMR, the Sync Beacon frame is not used for AM selection.

A Sync Beacon frame that does not meet either of the foregoing conditions can be used for AM selection.

In this embodiment of the present invention, when the received Sync Beacon frame can be used for AM selection, anchor master selection may be implemented by using the following algorithm:

```
if rxAMR > myAMR
   Update myAMR&myHC&TSF&myAMBTT;
elseif rxAMR == myAMR
   if rxAMBTT >myAMBTT
   Update myHC&TSF&myAMBTT;
   elseif rxAMBTT == myAMBTT
```

-continued

```
        if rxHC< myHC – 1
            Update myHC&TSF;
        end
    end
    else
        if rxAMR >= myMR
            Update myAMR&myHC&TSF&myAMBTT;
        else
            myAMR = myMR;
            myHC = 0;
            myAMBTT = 0;
        end
    end
```

According to the method for anchor master selection described in the foregoing embodiment and provided in the present invention and, a case that occurs when an MR value of an AM becomes smaller is described by using an example in the following.

As shown in FIG. 5-b, FIG. 5-b is a schematic diagram of a process of updating AM information recorded in each device according to an embodiment of the present invention. It is assumed that initial MRs of four NAN devices A, B, C, and D are respectively 10, 6, 8, and 9, and therefore, A is an AM. Two neighboring nodes can mutually listen to and obtain a sent Sync Beacon frame, that is, A can receive a Sync Beacon frame sent by B, B can receive a Sync Beacon frame sent by A or C, C can receive a Sync Beacon frame sent by B or D, and D can receive a Sync Beacon frame sent by C.

In FIG. 5-b, an initial condition of the four devices A, B, C, and D is similar to that in FIG. 5-a, that is, A is an AM. It is assumed that an MR of A is changed from 10 to 7 at a specific moment, and therefore an AMR of A is also changed to 7. If a Sync Beacon frame of A is sent earlier than that of B, when the frame is received by B, according to the algorithm provided in this embodiment of the present invention, an MR (=6) of B is less than an rxAMR (=7) of A, and therefore, B performs updating according to a state of A, where a new AMR is 7, and an HC is 1; and if a Sync Beacon frame of B is sent earlier than that of A, when A receives the frame, because an rxAMR (=10) is the same as an OldAMR (=10) of A, the frame is not used for AM selection. This avoids that an old AMR overwrites a new AMR.

Subsequently, the Sync Beacon frame sent by B is received by C, according to the algorithm provided in this embodiment of the present invention, C becomes an AM. C continues to send a Sync Beacon frame, which is received by B and D; according to the algorithm provided in this embodiment of the present invention, D becomes an AM, and B updates a state according to the Sync Beacon frame sent by C. Thereafter, D sends a Sync Beacon frame; because an AMR (=9) of D is largest, a state of D is received by C and is sent in a Sync Beacon frame in a next DW until updating of all nodes in the entire NAN network is completed.

In this embodiment of the present invention, in a preset time period after an AMR recorded in a device is changed (an AMR before the updating is recorded as OldAMR), if an rxAMR in the received Sync Beacon frame is equal to an OldAMR of the device, or when rxAMR<myAMR, the Sync Beacon frame is not used for AM selection. Therefore, two variables need to be maintained inside each device: the OldAMR and OldAMR_timer. The former records the AMR value before updating, and the latter is a timer. Each time the AMR recorded in the device is changed, the timer is reset to a preset value (for example, N DW/DWs), and then performs timing by subtraction until the timer is changed to 0.

A selection result of an execution process of AM selection is carried in a Sync Beacon frame sent by a NAN device in a sync state, and in principle, each device has an equal opportunity to enter a sync state; therefore, an AM selection algorithm inside a device may be indirectly learned by creating a corresponding condition and detecting a Sync Beacon frame sent by the device, and therefore, an AM selection algorithm described in this embodiment of the present invention is detectable.

The common AM selection algorithm (hereinafter referred to as an original solution) and an AM selection algorithm provided in this embodiment of the present invention (hereinafter referred to as a new solution) are separately described in the foregoing examples, and an simulation comparison is performed between the original solution and the new solution in the following section, so as to describe an advantage of the new solution.

1. Simulation Assumption

A simulation area is a circular area whose radius is 500 m, and 253 NAN devices are evenly distributed in this area. A transmit power of a device is 20 dBm, and a channel attenuation model is (L represents a path loss):

$$L(d) = \begin{cases} 38.45 + 20 \lg(d), & d \leq 5 \\ 52.45 + 35 \lg(d/5), & d > 5 \end{cases}.$$

It is assumed that communication bandwidth is 20 MHz, receiver sensitivity of the device is −92 dBm, a noise power is −96 dBm, and a receiving threshold is SINR>0 dBm; it can be obtained, by means of calculation according to the foregoing formula, that a communication range of the device is approximately 250 m.

In simulation of the new solution, a reset value of Old-AMR_timer is 5 DWs.

A simulation time is 1000 DWs, and a clock drift is U (−25, 25) ppm, where U represents even distribution. Both MR updating and subtraction counting of AM_timer occur when a DW starts. All simulation diagrams are observed outside a DW.

2. Performance Comparison 2.1 AMR Recorded in Device

A largest MR in an entire NAN cluster varies with an MR of a device, and therefore, an AMR recorded in each device should also vary accordingly. Referring to FIG. 6-a and FIG. 6-b, FIG. 6-a and FIG. 6-b are respectively schematic diagrams of statistics collection on an AMR value in a common method for AM selection and in a method for AM selection according to an embodiment of the present invention. In FIG. 6-a and FIG. 6-b, a horizontal coordinate is a discovery window index (DW Index), and a vertical coordinate is an anchor master rank (Anchor Master Rank) in a NAN device (device). It can be learned, by comparing an AMR recorded in each device in the original solution with that in the new solution, that obviously, the original solution causes different AMRs recorded in devices in a NAN network, and the new solution is relatively "clean", and an AMR recorded in each device is a same value in most cases, which can ensure that time synchronization between devices is implemented.

Further, FIG. 6-c is obtained by magnifying a top of FIG. 6-a, and FIG. 6-d is obtained by magnifying a top of FIG. 6-b. In FIG. 6-c and FIG. 6-d, a horizontal coordinate is a discovery window index (DW Index), and a vertical coordinate is an anchor master rank (Anchor Master Rank) in a NAN device (device). It can be found, by comparing the two figures of FIG. 6-*c* and FIG. 6-*d*, that an AMR recorded in a device in the original solution changes once after a relatively long time, but an AMR recorded in a device in the new solution changes more frequently. Referring to FIG. 6-*e*, FIG. 6-*e* is a schematic diagram of statistics collection on a largest MR in a NAN network in a common method for AM selection. As shown in FIG. 6-*f*, FIG. 6-*f* is a schematic diagram of statistics collection on a largest MR in a NAN network in a method for AM selection according to an embodiment of the present invention. In FIG. 6-*e* and FIG. 6-*f*, a horizontal coordinate is a discovery window index (DW Index), and a vertical coordinate is a largest master rank (Max Master Rank) in a NAN device (device). It can be found, with reference to variation status of the largest MRs in the NAN networks in FIG. 6-*e* and FIG. 6-*f*, that the AMR recorded in the device in the new solution is basically consistent with a change of the largest MR in the NAN network, but the AMR recorded in the device in the original solution cannot keep up with a change of the largest MR in the NAN network.

2.2. Quantity of AMs in NAN Network

The original solution and the new solution result in a difference in the quantity of AMs in the network. As shown in FIG. 6-*g*, FIG. 6-*g* is a schematic diagram of statistics collection on the quantity of AMs in a NAN network in a common method for AM selection. As shown in FIG. 6-*h*, FIG. 6-*h* is a schematic diagram of statistics collection on the quantity of AMs in a NAN network in a method for AM selection according to an embodiment of the present invention. In FIG. 6-*g* and FIG. 6-*h*, a horizontal coordinate is a discovery window index (DW Index), and a vertical coordinate is the quantity of anchor masters (the number of Anchor Master). In the original solution, no AM exists or two AMs exist in the network at most time; however, in the new solution, only one AM is maintained in the network in most cases. An AM is defined as a Master with a largest MR, and is a reference of synchronization of the NAN network. Generally, there is only one. Therefore, a result of the new solution better satisfies a design objective.

2.3. HC of Device

An HC of a device in a NAN network is separately shown in FIG. 6-*i* and FIG. 6-*j* when the original solution and the new solution are applied. As shown in FIG. 6-*i*, FIG. 6-*i* is a schematic diagram of statistics collection on an HC in a NAN network in a common method for AM selection. As shown in FIG. 6-*j*, FIG. 6-*j* is a schematic diagram of statistics collection on an HC in a NAN network in a method for AM selection according to an embodiment of the present invention. In FIG. 6-*i* and FIG. 6-*j*, a horizontal coordinate is a discovery window index (DW Index), and a vertical coordinate is a hop count (Hop Count). In the new solution, an HC in the network is always relatively small, and a largest HC does not exceed 8; however, in the original solution, when no larger MR appears, the HC of the device continuously increases, and a case in which HC=23 eventually occurs. Because a Sync Beacon frame in which an HC exceeds a specific threshold is discarded, even if a very small network scale is designed, an oversized HC results in a crash of the NAN network.

It should be noted that, in the original solution, an HC suddenly decreases after increasing to a specific value, and this change is not caused by occurrence of a device with a larger MR in the NAN network. Next, that the HC does not become larger is analyzed in the following, and a reason why the HC does not become larger is that a backoff value (unit: timeslot) of sending a Sync Beacon frame is specified as follows:

$$\text{backoff\_timer} = \begin{cases} U(0, 15), & HC = 0 \\ U(HC^*40, (HC+1)^*40), & HC > 0 \end{cases}.$$

That is, the backoff time is related to the HC. A larger HC indicates a larger backoff value and later sending of a Sync Beacon frame. Another device further needs to send a service discovery frame, which occupies specific time, but a DW only has 16 Tus. Therefore, when the HC increases to a specific degree, backoffer_timer is too large, which causes that a Sync Beacon frame is not sent in the DW in time. Therefore, after waiting for 16 DWs, NAN devices set themselves to AMs in succession, and HCs are set to 0 again. Actually, in this case, the original network is crashed, and a NAN Cluster is re-established between devices. Therefore, this is a reason why the AMR recorded in the device suddenly keeps up with a change of the largest MR once after a relatively long time in the original solution in FIG. 6-*c*.

2.4. TSF Synchronization

As shown in FIG. 6-*k*, FIG. 6-*k* is a schematic diagram of statistics collection on a change of a TSF in a NAN network in a common method for AM selection. As shown in FIG. 6-*l*, FIG. 6-*l* is a schematic diagram of statistics collection on a change of a TSF in a NAN network in a method for AM selection according to an embodiment of the present invention. In FIG. 6-*k* and FIG. 6-*l*, a horizontal coordinate is a time t, which is in unit of μs (μs), and a vertical coordinate is a Time Synchronization Function Drift (Time Synchronization Function Drift), which is in unit of μs (μs). In the original solution, because a real AM is lost, each device acts in its own way, and as time goes by, an obvious difference occur between TSFs of devices; however, in the new solution, because all devices can update AM information in time, and always maintain time synchronization with an AM, a difference between TSFs of devices is very small, and time synchronization between devices can be well implemented. Obviously, a TSF synchronization capability of the new solution is far better than that of the original solution.

It can be learned, by using the foregoing description about this embodiment of the present invention, that after a device receives a NAN Beacon frame, if the NAN Beacon frame is used for AM selection, when a first AMR included in the NAN Beacon frame is less than a second AMR recorded in the device, and an MR of the device is greater than the first AMR, the device switches a role of the device to AM; or if the NAN Beacon frame is used for AM selection, when the first AMR included in the NAN Beacon frame is less than the second AMR recorded in the device, and an MR of the device is less than the first AMR, the device updates, according to the NAN Beacon frame, second AM information and second TSF information that are recorded in the device. In a case in which the NAN Beacon frame received by the device can be used for AM selection, when the first AMR is less than the second AMR, and the MR of the device is greater than the first AMR, the role of the device is switched to AM, and the device whose role is switched to AM may overwrite an original AM in a NAN cluster, and therefore an original AMR in the NAN cluster is also overwritten; even if an MR of the AM becomes smaller, a new AM is selected quickly. Therefore, there is always an AM in the NAN cluster, and each device can record correct AM information, which avoids a crash of the entire NAN cluster, and ensures that time synchronization between devices can be implemented. When the MR value of the device is insufficient to make the device an AM, that is, when the first AMR is less than the second AMR recorded in the device, and the MR of the device is less than the first AMR, the device may update, according to the NAN Beacon frame, the second AM information and the second TSF information that are recorded in the device, and therefore the second AMR recorded in the device is also updated, and the original AMR in the NAN cluster is also overwritten; even if the MR of the AM becomes smaller, a new AM may be selected quickly. Therefore, there is always an AM in the NAN cluster, and each device can record the correct AM information, which avoids a crash of the entire NAN cluster and ensures that time synchronization between devices can be implemented.

It should be noted that, for brief description, the foregoing method embodiments are represented as a series of actions. However, a person skilled in the art should appreciate that the present invention is not limited to the described order of the actions, because according to the present invention, some steps may be executed in other orders or simultaneously. In addition, a person skilled in the art should also understand that all the embodiments described in this specification belong to exemplary embodiments, and the involved actions and modules may not be necessarily mandatory to the present invention.

To better implement the foregoing solutions in this embodiment of the present invention, a relevant apparatus configured to implement the foregoing solutions is provided in the following.

Referring to FIG. 7-a, a device 700 for anchor master selection provided in an embodiment of the present invention may include: a beacon frame receiving module 701, a role switching module 702, and an information updating module 703.

The beacon frame receiving module 701 is configured to receive a neighbor awareness networking beacon NAN Beacon frame, where the NAN Beacon frame carries first AM information and first time synchronization function TSF information, and the first AM information includes: a first anchor master rank AMR, a first hop count HC, and a first anchor master beacon transmission time AMBTT.

The role switching module 702 is configured to: if the NAN Beacon frame is used for AM selection, when the first AMR is less than a second AMR, and a master rank MR of the device is greater than the first AMR, switch a role of the device to AM, where the device records second AM information, and the second AM information includes: the second AMR, a second HC, and a second AMBTT.

The information updating module 703 is configured to: if the NAN Beacon frame is used for AM selection, when the first AMR is less than the second AMR, and the MR of the device is less than the first AMR, update, according to the NAN Beacon frame, the second AM information and second TSF information that are recorded in the device.

In some embodiments of the present invention, the role switching module 702 is further configured to: if the NAN Beacon frame is used for AM selection, when the first AMR is less than the second AMR, and the MR of the device is equal to the first AMR, switch the role of the device to AM; or the information updating module 703 is further configured to: if the NAN Beacon frame is used for AM selection, when the first AMR is less than the second AMR, and the MR of the device is equal to the first AMR, update, according to the NAN Beacon frame, the second AM information and the second TSF information that are recorded in the device.

Referring to FIG. 7-b, in some embodiments of the present invention, the device 700 for anchor master selection may further include:

an execution triggering module 704, configured to: if the first HC is less than or equal to the hop count threshold, trigger the role switching module 702 to execute the step of switching the role of the device to AM, or trigger the information updating module 703 to execute the step of updating, according to the NAN Beacon frame, the second AM information and the second TSF information that are recorded in the device.

As shown in FIG. 7-b, in some other embodiments of the present invention, the device 700 for anchor master selection may further include:

a beacon frame discarding module 705, configured to: if the first HC is greater than the preset hop count threshold, discard the NAN Beacon frame.

Referring to FIG. 7-c, in some embodiments of the present invention, compared with the device 700 for anchor master selection shown in FIG. 7-a, when the device 700 is an AM, the device 700 for anchor master selection may further include:

a first AM selection determining module 706, configured to determine, in the following manners, whether the NAN Beacon frame is used for AM selection:

if the first AMR is less than the second AMR, determining that the NAN Beacon frame is not used for AM selection;

if the first AMR is greater than or equal to the second AMR, and if the first AMR is equal to a third AMR within a preset time period after updating of the second AMR starts, determining that the NAN Beacon frame is not used for AM selection, where the third AMR is an AMR before the second AMR in the device is updated; and if the NAN Beacon frame does not meet a first condition, determining that the NAN Beacon frame is used for AM selection, where the first condition is as follows: the first AMR is less than the second AMR, or the first AMR is equal to the third AMR within the preset time period.

Referring to FIG. 7-d, in some embodiments of the present invention, compared with the device 700 for anchor master selection shown in FIG. 7-a, when the device 700 is an AM, the device 700 for anchor master selection may further include:

a second AM selection determining module 707, configured to determine, in the following manners, whether the NAN Beacon frame is used for AM selection:

if the first AMR is less than the second AMR, determining that the NAN Beacon frame is not used for AM selection;

if the first AMR is greater than or equal to the second AMR, when the second AMR in the device is updated, if the first AMBTT is less than the second AMBTT within a preset time period after updating of the second AMR starts, determining that the NAN Beacon frame is not used for AM selection; and if the NAN Beacon frame does not meet a second condition, determining that the NAN Beacon frame is used for AM selection, where the first condition is as follows: the second AMR is less than the second AMR, or the first AMBTT is less than the second AMBTT within the preset time period.

Referring to FIG. 7-e, in some embodiments of the present invention, compared with the device 700 for anchor master selection shown in FIG. 7-a, when the device 700 is not an AM, the device 700 for anchor master selection may further include:

a third AM selection determining module 708, configured to determine, in the following manners, whether the NAN Beacon frame is used for AM selection:

when the second AMR in the device is updated, if the first AMR is less than the second AMR within a preset time period after updating of the second AMR starts, determining that the NAN Beacon frame is not used for AM selection;

if the first AMR is equal to a third AMR within the preset period time, determining that the NAN Beacon frame is not used for AM selection, where the third AMR is an AMR before the second AMR in the device is updated; and if the NAN Beacon frame does not meet a third condition, determining that the NAN Beacon frame is used for AM selection, where the third condition is as follows: the first AMR is less than the second AMR within the preset time period, or the first AMR is equal to the third AMR within the preset time period.

Referring to FIG. 7-f, in some embodiments of the present invention, compared with the device 700 for anchor master selection shown in FIG. 7-a, when the device 700 is not an AM, the device 700 for anchor master selection may further include:

a fourth AM selection determining module 709, configured to determine, in the following manners, whether the NAN Beacon frame is used for AM selection:

if the first AMR is less than the second AMR within a preset time period after updating of the second AMR starts, determining that the NAN Beacon frame is not used for AM selection;

if the first AMBTT is less than the second AMBTT within the preset time period, determining that NAN Beacon frame is not used for AM selection; and if the NAN Beacon frame does not meet a fourth condition, determining that the NAN Beacon frame is used for AM selection, where the fourth condition is as follows: the first AMR is less than the second AMR within the preset time period, or the first AMR is equal to the third AMR within the preset time period.

In some embodiments of the present invention, the information updating module 703 is further configured to: if the NAN Beacon frame is used for AM selection, when the first AMR is greater than the second AMR, update, according to the NAN Beacon frame, the second AM information and the second TSF information that are recorded in the device.

It should be noted that referring to FIG. 7-g, in some embodiments of the present invention, the information updating module 703 includes:

a first AMR updating submodule 7031, configured to update the second AMR value to the first AMR value;

a first HC updating submodule 7032, configured to update the second HC value to the first HC value plus 1;

a first AMBTT updating submodule 7033, configured to: if the NAN Beacon frame is sent by the AM, update the second AMBTT value to a value of a preset byte/preset bytes of the first TSF information; or if the NAN Beacon frame is not sent by the AM, update the second AMBTT value to the first AMBTT; and a TSF updating submodule 7034, configured to update a value of the second TSF information to a value of the first TSF information.

In some other embodiments of the present invention, the information updating module 703 is further configured to: if the NAN Beacon frame is used for AM selection, when the first AMR is equal to the second AMR, and the first AMBTT is greater than the second AMBTT, update, according to the NAN Beacon frame, the second TSF information and some information or all information of the second AM information that are recorded in the device.

Specifically, the information updating module 703 may include:

a first HC updating submodule, configured to update the second HC value to the first HC value plus 1;

a first AMBTT updating submodule, configured to: if the NAN Beacon frame is sent by the AM, update the second AMBTT value to the value of the preset byte/bytes of the first TSF information; or if the NAN Beacon frame is not sent by the AM, update the second AMBTT value to the first AMBTT; and a TSF updating submodule, configured to update the value of the second TSF information to the value of the first TSF information.

In some embodiments of the present invention, the information updating module 703 is further configured to: if the NAN Beacon frame is used for AM selection, when the first AMR is equal to the second AMR, and when the first AMBTT is equal to the second AMBTT, and the first HC is less than the second HC minus 1, update, according to the NAN Beacon frame, the second TSF information and some information or all information of the second AM information that are recorded in the device.

Specifically, the information updating module 703 may include:

a first HC updating submodule, configured to update the second HC value to the first HC value plus 1; and a TSF updating submodule, configured to update the value of the second TSF information to the value of the first TSF information.

Referring to FIG. 7-h, in some embodiments of the present invention, compared with the device 700 for anchor master selection shown in FIG. 7-a, the device 700 for anchor master selection may further include at least one of the following modules, and FIG. 7-h shows a Beacon frame ignoring module 710, a first updating module 711, and a third updating module 712 that are included in the device 700 for anchor master selection.

The Beacon frame ignoring module 710 is configured to: if the NAN Beacon frame is used for AM selection, when the first AMR is equal to the second AMR, and the first HC is greater than or equal to the second HC, ignore the first AM information carried in the NAN Beacon frame.

The first updating module 711 is configured to: if the NAN Beacon frame is used for AM selection, and the NAN Beacon frame is not sent by the AM, when the first AMR is equal to the second AMR, the first HC is equal to the second HC minus 1, and the first AMBTT is greater than the second AMBTT, update the second AMBTT value to the first AMBTT, and update the value of the second TSF information to the value of the first TSF information.

The third updating module 712 is configured to: if the NAN Beacon frame is used for AM selection, when the first AMR is equal to the second AMR, and the first HC is less than the second HC minus 1, if the NAN Beacon frame is sent by the AM, update the second AMBTT value to the value of the preset byte/bytes of the first TSF information; or if the NAN Beacon frame is not sent by the AM, update the second AMBTT value to the first AMBTT, update the value of the second TSF information to the value of the first TSF information, and update the second HC value to the first HC value plus 1.

Referring to FIG. 7-i, in some embodiments of the present invention, compared with the device 700 for anchor master selection shown in FIG. 7-a, the device 700 for anchor master selection may further include at least one of the following modules, and the FIG. 7-*i* shows the Beacon frame ignoring module 710, a second updating module 713, and the third updating module 712 that are included in the device 700 for anchor master selection.

The Beacon frame ignoring module 710 is configured to: if the NAN Beacon frame is used for AM selection, when the first AMR is equal to the second AMR, and the first HC is greater than or equal to the second HC, ignore the first AM information carried in the NAN Beacon frame.

The second updating module 713 is configured to: if the NAN Beacon frame is used for AM selection, and the NAN Beacon frame is sent by an AM, when the first AMR is equal to the second AMR, the first HC is equal to the second HC minus 1, and the value of the preset byte/bytes of the first TSF information is greater than the second AMBTT, update the second AMBTT value to the first AMBTT, and update the value of the second TSF information to the value of the first TSF information.

The third updating module 712 is configured to: if the NAN Beacon frame is used for AM selection, when the first AMR is equal to the second AMR, and the first HC is less than the second HC minus 1, if the NAN Beacon frame is sent by the AM, update the second AMBTT value to the value of the preset byte/bytes of the first TSF information; or if the NAN Beacon frame is not sent by the AM, update the second AMBTT value to the first AMBTT, update the value of the second TSF information to the value of the first TSF information, and update the second HC value to the first HC value plus 1.

In some embodiments of the present invention, the role switching module 702 is further configured to: when a difference obtained by subtracting the second AMBTT from the value of the second TSF information is greater than a preset transmission time threshold, switch the role of the device to AM.

In some embodiments of the present invention, when the device is not an AM, and the MR of the device is updated, the role switching module 702 is further configured to: when an updated MR is greater than the second AMR, switch the role of the device to AM.

It should be noted that, referring to FIG. 7-*j*, in some embodiments of the present invention, the role switching module 702 includes:

a second AMR updating submodule 7021, configured to update the second AMR value to the MR value of the device;

a second HC updating submodule 7022, configured to update the second HC value to 0; and a second AMBTT updating submodule 7023, configured to update the second AMBTT value to a value of a preset byte/preset bytes of the second TSF information.

In some embodiments of the present invention, the device 700 for anchor master selection may further include: a role maintaining module, configured to: when the MR of the device is updated, maintain an AM role, and update the recorded second AMR to an updated MR value of the device.

It should be noted that content such as information exchange between the modules/units of the foregoing apparatus and the execution processes thereof is based on the same idea as that of the method embodiments of the present invention, and produces the same technical effects as that of the method embodiments of the present invention. For the specific content, refer to the descriptions in the method embodiment described above, and details are not described herein again.

In conclusion, it can be learned, by using the foregoing description about this embodiment of the present invention, that after a beacon frame receiving module receives a NAN Beacon frame, if the NAN Beacon frame is used for AM selection, when a first AMR included in the NAN Beacon frame is less than a second AMR recorded in a device, and an MR of the device is greater than the first AMR, a role switching module switches a role of the device to AM; or if the NAN Beacon frame is used for AM selection, when the first AMR included in the NAN Beacon frame is less than the second AMR recorded in the device, and an MR of the device is less than the first AMR, an information updating module updates, according to the NAN Beacon frame, second AM information and second TSF information that are recorded in the device. In a case in which the NAN Beacon frame received by the device can be used for AM selection, when the first AMR is less than the second AMR, and the MR of the device is greater than the first AMR, the role of the device is switched to AM, and the device whose role is switched to AM may overwrite an original AM in a NAN cluster, and therefore an original AMR in the NAN cluster is also overwritten; even if an MR of the AM becomes smaller, a new AM is selected quickly. Therefore, there is always an AM in the NAN cluster, and each device can record correct AM information, which avoids a crash of the entire NAN cluster, and ensures that time synchronization between devices can be implemented. When the MR value of the device is insufficient to make the device an AM, that is, when the first AMR is less than the second AMR recorded in the device, and the MR of the device is less than the first AMR, the device may update, according to the NAN Beacon frame, the second AM information and the second TSF information that are recorded in the device, and therefore the second AMR recorded in the device is also updated, and the original AMR in the NAN cluster is also overwritten; even if the MR of the AM becomes smaller, a new AM may be selected quickly. Therefore, there is always an AM in the NAN cluster, and each device can record correct AM information, which avoids a crash of the entire NAN cluster and ensures that time synchronization between devices can be implemented.

This embodiment of the present invention further provides a computer storage medium, where the computer storage medium stores a program, and the program executes a part or all of steps recorded in the foregoing method embodiments.

Figure 8:
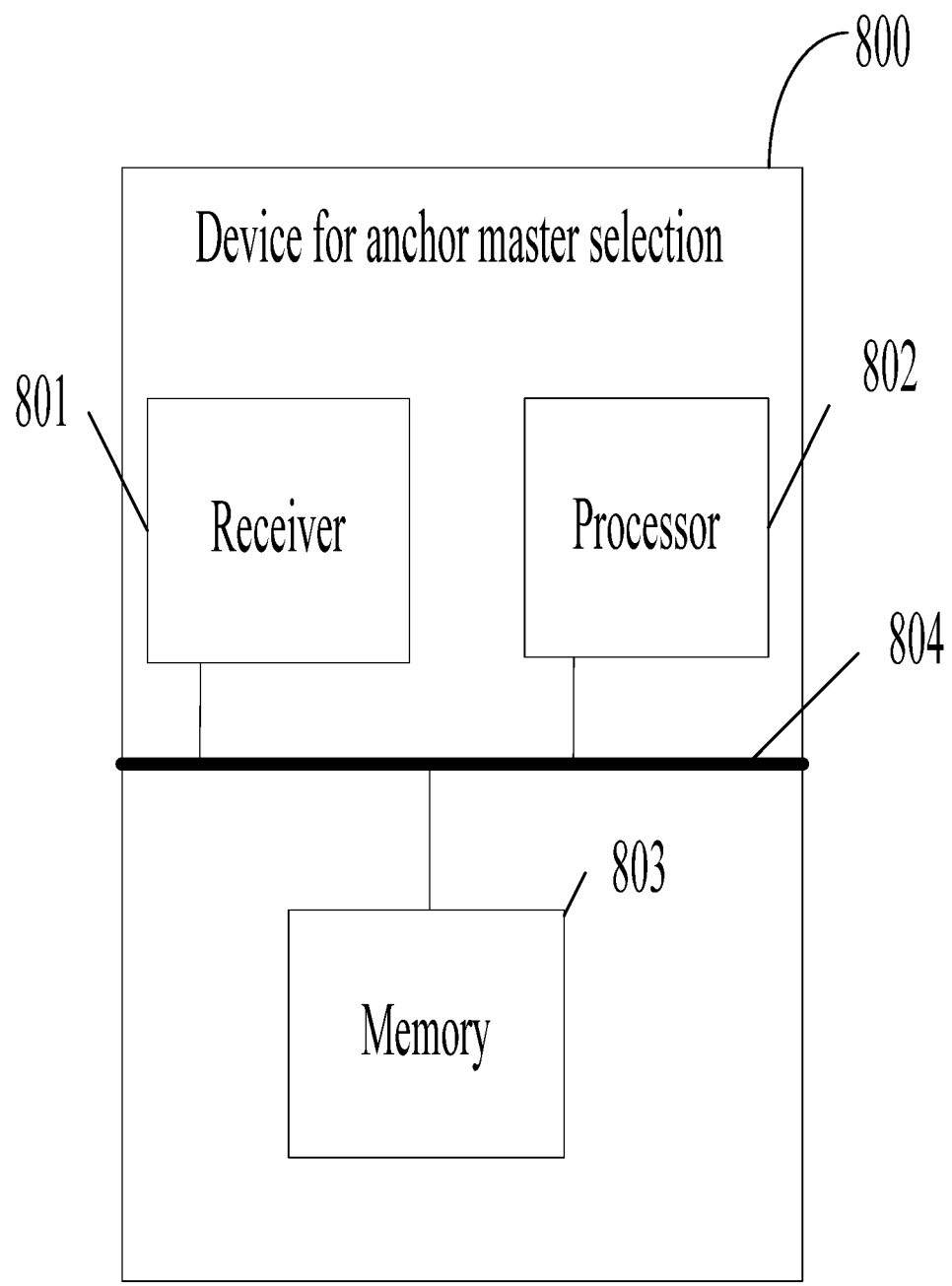
FIG. 8 is a schematic structural diagram of composition of another device for anchor master selection according to an embodiment of the present invention.

Another device for anchor master selection provided in this embodiment of the present invention is introduced in the following. Referring to FIG. 8, a device 800 for anchor master selection includes: at least one receiver 801, at least one processor 802, at least one memory 803, and at least one communication bus 804, where the at least one communication bus 804 is used to implement connection and mutual communication between these components. (The quantity of the processors 802 in the device 800 for anchor master selection may be one or more, and one processor is used as an example in FIG. 8). In some embodiments of the present invention, the at least one receiver 801, the at least one processor 802, and the memory 803 may be connected by using the communication bus or another means. An example in which connection is implemented by using the communication bus is used in FIG. 8.

The communication bus 804 may be an industry standard architecture (Industry Standard Architecture, ISA for short) bus, a peripheral component interconnect (Peripheral Component Interconnect, PCI for short) bus, or an extended industry standard architecture (Extended Industry Standard Architecture, EISA for short) bus, or the like. The bus 804 may be categorized into an address bus, a data bus, a control bus, and the like. For ease of denotation, the bus is represented by using only one thick line in FIG. 8; however, it does not indicate that there is only one bus or only one type of bus.

The memory 803 is configured to store executable program code, where the program code includes a computer operation instruction. The memory 803 may include a high-speed RAM memory, and may further include a non-volatile memory (non-volatile memory), for example, at least one magnetic disk memory.

The processor 802 may be a central processing unit (Central Processing Unit, CPU for short), an application-specific integrated circuit (Application Specific Integrated Circuit, ASIC for short), or one or more integrated circuits configured to implement this embodiment of the present invention.

The processor 802 is configured to execute the executable program code stored in the memory 803, such as a computer program, so as to run a program corresponding to the executable code.

The receiver 801 is configured to receive a neighbor awareness networking beacon NAN Beacon frame, where the NAN Beacon frame carries first AM information and first time synchronization function TSF information, and the first AM information includes: a first anchor master rank AMR, a first hop count HC, and a first anchor master beacon transmission time AMBTT.

When executing the executable program code stored in the memory 803, the processor 802 may specifically execute the following steps:

after the NAN Beacon frame is received, if the NAN Beacon frame is used for AM selection, when the first AMR is less than a second AMR, and a master rank MR of the device is greater than the first AMR, switching a role of the device to AM, where second AM information are recorded in the device, and the second AM information includes: the second AMR, a second HC, and a second AMBTT; and if the NAN Beacon frame is used for AM selection, when the first AMR is less than the second AMR, and the MR of the device is less than the first AMR, updating, according to the NAN Beacon frame, the second AM information and second TSF information that are recorded in the device.

In some embodiments of the present invention, the processor 802 is further configured to execute the following steps:

if the NAN Beacon frame is used for AM selection, when the first AMR is less than the second AMR, and the MR of the device is equal to the first AMR, switching the role of the device to AM, or updating, by the device, according to the NAN Beacon frame, the second AM information and the second TSF information that are recorded in the device.

In some embodiments of the present invention, before the processor 802 switches the role of the device to AM, or updates, by the device, according to the NAN Beacon frame, the second AM information and the second TSF information that are recorded in the device, the processor 802 is further configured to execute the following steps:

if the first HC is less than or equal to the hop count threshold, triggering execution of the step of switching the role of the device to AM, or triggering execution of the step of updating, according to the NAN Beacon frame, the second AM information and the second TSF information that are recorded in the device.

In some embodiments of the present invention, when the device is an AM, the processor 802 determines, in the following manners, whether the NAN Beacon frame is used for AM selection:

if the first AMR is less than the second AMR, determining that the NAN Beacon frame is not used for AM selection;

if the first AMR is greater than or equal to the second AMR, and if the first AMR is equal to a third AMR within a preset time period after updating of the second AMR starts, determining that the NAN Beacon frame is not used for AM selection, where the third AMR is an AMR before the second AMR in the device is updated; and if the NAN Beacon frame does not meet a first condition, determining that the NAN Beacon frame is used for AM selection, where the first condition is as follows: the first AMR is less than the second AMR, or the first AMR is equal to the third AMR within the preset time period.

When the device is an AM, in some embodiments of the present invention, the processor 802 may determine, in the following manners, whether the NAN Beacon frame is used for AM selection:

if the first AMR is less than the second AMR, determining that the NAN Beacon frame is not used for AM selection;

if the first AMR is greater than or equal to the second AMR, and if the first AMBTT is less than the second AMBTT within a preset time period after updating of the second AMR starts, determining that the NAN Beacon frame is not used for AM selection; and if the NAN Beacon frame does not meet a second condition, determining that the NAN Beacon frame is used for AM selection, where the second condition is as follows: the first AMR is less than the second AMR, or the first AMBTT is less than the second AMBTT within the preset time period.

When the device is not an AM, in some embodiments of the present invention, the processor 802 may determine, in the following manners, whether the NAN Beacon frame is used for AM selection:

if the first AMR is less than the second AMR within a preset time period after updating of the second AMR starts, determining that the NAN Beacon frame is not used for AM selection;

if the first AMR is equal to a third AMR within the preset period time, determining that the NAN Beacon frame is not used for AM selection, where the third AMR is an AMR before the second AMR in the device is updated; and if the NAN Beacon frame does not meet a third condition, determining that the NAN Beacon frame is used for AM selection, where the third condition is as follows: the first AMR is less than the second AMR within the preset time period, or the first AMR is equal to the third AMR within the preset time period.

When the device is not an AM, in some embodiments of the present invention, the processor 802 may determine, in the following manners, whether the NAN Beacon frame is used for AM selection:

if the first AMR is less than the second AMR within a preset time period after updating of the second AMR starts, determining that the NAN Beacon frame is not used for AM selection;

if the first AMBTT is less than the second AMBTT within the preset time period, determining that NAN Beacon frame is not used for AM selection; and if the NAN Beacon frame does not meet a fourth condition, determining that the NAN Beacon frame is used for AM selection, where the fourth condition is as follows: the first AMR is less than the second AMR within the preset time period, or the first AMBTT is less than the second AMBTT within the preset time period.

In some embodiments of the present invention, the processor 802 is further configured to execute the following steps: if the NAN Beacon frame is used for AM selection, when the first AMR is greater than the second AMR, updating, according to the NAN Beacon frame, the second AM information and the second TSF information that are recorded in the device.

In some embodiments of the present invention, the updating, by the processor 802 according to the NAN Beacon frame, the second AM information and the second TSF information that are recorded in the device specifically includes:
    updating the second AMR value to the first AMR value;
    updating the second HC value to the first HC value plus 1;
    if the NAN Beacon frame is sent by the AM, updating the second AMBTT value to a value of a preset byte/preset bytes of the first TSF information; or if the NAN Beacon frame is not sent by the AM, updating the second AMBTT value to the first AMBTT; and
    updating a value of the second TSF information to a value of the first TSF information.

In some embodiments of the present invention, the processor 802 is further configured to execute the following steps:
    if the NAN Beacon frame is used for AM selection, when the first AMR is equal to the second AMR, if the first AMBTT is greater than the second AMBTT, or the first AMBTT is equal to the second AMBTT and the first HC is less than the second HC minus 1, updating, according to the NAN Beacon frame, the second AM information and the second TSF information that are recorded in the device.

In some embodiments of the present invention, the processor 802 is further configured to execute at least one of the following steps:
    if the NAN Beacon frame is used for AM selection, when the first AMR is equal to the second AMR, and the first HC is greater than or equal to the second HC, ignoring the first AM information carried in the NAN Beacon frame;
    if the NAN Beacon frame is used for AM selection, when the first AMR is equal to the second AMR, the first AMBTT value is not 0, the first HC is equal to the second HC minus 1, and the first AMBTT is greater than the second AMBTT, updating the second AMBTT value to the first AMBTT, and updating the value of the second TSF information to the value of the first TSF information;
    if the NAN Beacon frame is used for AM selection, and the first AMBTT value is 0, when the first AMR is equal to the second AMR, the first HC is equal to the second HC minus 1, and the value of the preset byte/bytes of the first TSF information is greater than the second AMBTT, updating the second AMBTT value to the first AMBTT, and updating the value of the second TSF information to the value of the first TSF information; and
    if the NAN Beacon frame is used for AM selection, when the first AMR is equal to the second AMR, and the first HC is less than the second HC minus 1, if the NAN Beacon frame is sent by the AM, updating the second AMBTT value to the value of the preset byte/bytes of the first TSF information; or if the NAN Beacon frame is not sent by the AM, updating the second AMBTT value to the first AMBTT, updating the value of the second TSF information to the value of the first TSF information, and updating the second HC value to the first HC value plus 1.

In some embodiments of the present invention, the processor 802 is further configured to execute:
    when a difference obtained by subtracting the second AMBTT from the value of the second TSF information is greater than a preset transmission time threshold, switching the role of the device to AM.

In some embodiments of the present invention, when the device is not an AM, and the MR of the device is updated, the processor 802 is further configured to execute the following steps:
    when an updated MR of the device is greater than the second AMR, switching the role of the device to AM.

In some embodiments of the present invention, the switching, by the processor 802, the role of the device to AM specifically includes:
    updating the second AMR value to the first AMR value;
    updating the second HC value to 0; and
    updating the second AMBTT value to the value of the preset byte/bytes of the second TSF information.

In some embodiments of the present invention, when the device is an AM, the processor 802 is further configured to execute the following steps:
    when the MR of the device is updated, maintaining an AM role, and updating the recorded second AMR to an updated MR value of the device.

It can be learned, by using the foregoing description about this embodiment of the present invention, that after a device receives a NAN Beacon frame, if the NAN Beacon frame is used for AM selection, when a first AMR included in the NAN Beacon frame is less than a second AMR recorded in the device, and an MR of the device is greater than the first AMR, the device switches a role of the device to AM; or if the NAN Beacon frame is used for AM selection, when the first AMR included in the NAN Beacon frame is less than the second AMR recorded in the device, and an MR of the device is less than the first AMR, the device updates, according to the NAN Beacon frame, second AM information and second TSF information that are recorded in the device. In a case in which the NAN Beacon frame received by the device can be used for AM selection, when the first AMR is less than the second AMR, and the MR of the device is greater than the first AMR, the role of the device is switched to AM, and the device whose role is switched to AM may overwrite an original AM in a NAN cluster, and therefore an original AMR in the NAN cluster is also overwritten; even if an MR of the AM becomes smaller, a new AM is selected quickly. Therefore, there is always an AM in the NAN cluster, and each device can record correct AM information, which avoids a crash of the entire NAN cluster, and ensures that time synchronization between devices can be implemented. When the MR value of the device is insufficient to make the device an AM, that is, when the first AMR is less than the second AMR recorded in the device, and the MR of the device is less than the first AMR, the device may update, according to the NAN Beacon frame, the second AM information and the second TSF information that are recorded in the device, and therefore the second AMR recorded in the device is also updated, and the original AMR in the NAN cluster is also overwritten; even if the MR of the AM becomes smaller, a new AM may be selected quickly. Therefore, there is always an AM in the NAN cluster, and each device can record the correct AM information, which avoids a crash of the entire NAN cluster and ensures that time synchronization between devices can be implemented.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. An ordinary person skilled in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

The foregoing embodiments are merely intended for describing the technical solutions of the present invention, but not for limiting the present invention. Although the present invention is described in detail with reference to the foregoing embodiments, a person skilled in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for anchor master (AM) selection in a neighbor awareness networking (NAN) cluster, where the method comprises:
    recording, by a device in the NAN cluster, a second AM information and a second time synchronization function (TSF) information in the device, wherein the second AM information includes: a second anchor master rank (AMR), a second hop count (HC), and a second anchor master beacon transmission time (AMBTT);
    receiving, by the device, a NAN Beacon frame, wherein the NAN Beacon frame carries a first AM information and a first TSF information, wherein the first AM information includes: a first AMR, a first HC, and a first AMBTT;
    switching, by the device, a device role of the device to AM when the NAN Beacon frame is used for AM selection, the first AMR is less than the second AMR, a master rank (MR) of the device is greater than the first AMR, and the device role of the device is not set to AM; and
    updating, by the device, the second AM information and the second TSF information according to the NAN Beacon frame when the NAN Beacon frame is used for AM selection, the first AMR is less than the second AMR, the MR of the device is less than the first AMR, and the device role of the device is not set to AM.

2. The method according to claim 1, wherein updating the second AM information and the second TSF information according to the NAN Beacon frame comprises:
    updating, by the device, the second AMR value to equal the first AMR value;
    updating, by the device, the second HC value to equal the first HC value plus 1;
    updating, by the device, a value of the second TSF information to equal a value of the first TSF information; and
    updating, by the device, the second AMBTT value to equal a value of a preset byte or preset bytes of the first TSF information, when the NAN Beacon frame is received from an AM;
    updating, by the device, the second AMBTT value to equal the first AMBTT value, when the NAN Beacon frame is not received from an AM.

3. The method according to claim 1, further comprising:
    updating, by the device, the second TSF information and at least part of the second AM information, according to the NAN Beacon frame, when the NAN Beacon frame is used for AM selection, the first AMR is equal to the second AMR, the device role of the device is not set to AM, and one of the following conditions is met: i) the first AMBTT is greater than the second AMBTT; and ii) the first AMBTT is equal to the second AMBTT and the first HC is less than the second HC minus 1.

4. The method according to claim 2, further comprising:
    updating, by the device, the second TSF information and at least part of the second AM information, according to the NAN Beacon frame, when the NAN Beacon frame is used for AM selection, the first AMR is equal to the second AMR, the device role of the device is not set to AM, and one of the following conditions is met: i) the first AMBTT is greater than the second AMBTT; and ii) the first AMBTT is equal to the second AMBTT and the first HC is less than the second HC minus 1.

5. The method according to claim 1, wherein the switching, by the device, the device role of the device to AM comprises:
    updating, by the device, the second AMR value to equal the MR value of the device;
    updating, by the device, the second HC value to equal zero (0); and
    updating, by the device, the second AMBTT value to equal 0x00000000.

6. The method according to claim 2, wherein the switching, by the device, the device role of the device to AM comprises:
    updating, by the device, the second AMR value to equal the MR value of the device;
    updating, by the device, the second HC value to equal zero (0); and
    updating, by the device, the second AMBTT value to equal 0x00000000.

7. The method according to claim 3, wherein the switching, by the device, the device role of the device to AM comprises:

updating, by the device, the second AMR value to equal the MR value of the device;
updating, by the device, the second HC value to equal zero (0); and
updating, by the device, the second AMBTT value to equal 0x00000000.

8. The method according to claim 4, wherein the switching, by the device, the device role of the device to AM comprises:
updating, by the device, the second AMR value to equal the MR value of the device;
updating, by the device, the second HC value to equal zero (0); and
updating, by the device, the second AMBTT value to equal 0x00000000.

9. The method according to claim 1, wherein when the device role of the device is an AM, the method further comprising:
maintaining, by the device, the device role of the device as an AM when the MR value of the device is updated; and
updating, by the device, the recorded second AMR to equal an updated MR value of the device.

10. The method according to claim 2, wherein when the device role of the device is an AM, the method further comprising:
maintaining, by the device, the device role of the device as an AM when the MR value of the device is updated; and
updating, by the device, the recorded second AMR to equal an updated MR value of the device.

11. A device for anchor master (AM) selection in a neighbor awareness networking (NAN) cluster, where the device comprises:
a memory storing instructions and recording a second AM information and a second time synchronization function (TSF) information, wherein the second AM information includes: a second anchor master rank (AMR), a second hop count (HC), and a second anchor master beacon transmission time (AMBTT);
a receiver configured to receive a NAN Beacon frame, where the NAN Beacon frame carries a first AM information and a first TSF information, wherein the first AM information includes: a first AMR, a first HC, and a first AMBTT;
a processor configured to execute the instructions to perform operations of:
switching a device role of the device to AM when the NAN Beacon frame is used for AM selection, the first AMR is less than the second AMR, a master rank (MR) of the device is greater than the first AMR, and the device role of the device is not set to AM; and
updating, by the device, the second AM information and the second TSF information according to the NAN Beacon frame when the NAN Beacon frame is used for AM selection, the first AMR is less than the second AMR, the MR of the device is less than the first AMR, and the device role of the device is not set to AM.

12. The device according to claim 11, wherein the operation of updating comprises:
updating the second AMR value to equal the first AMR value;
updating the second HC value to equal the first HC value plus 1;
updating a value of the second TSF information to equal a value of the first TSF information; and
updating the second AMBTT value to equal a value of a preset byte or preset bytes of the first TSF information, when the NAN Beacon frame is received from an AM;
updating the second AMBTT value to equal the first AMBTT value, when the NAN Beacon frame is not received from an AM.

13. The device according to claim 11 wherein the processor is further configured to execute the instructions to perform operations of:
updating the second TSF information and at least part of the second AM information, according to the NAN Beacon frame, when the NAN Beacon frame is used for AM selection, the first AMR is equal to the second AMR, the device role of the device is not set to AM, and one of the following conditions is met: i) the first AMBTT is greater than the second AMBTT; and ii) the first AMBTT is equal to the second AMBTT and the first HC is less than the second HC minus 1.

14. The device according to claim 12, wherein the processor is further configured to execute the instructions to perform operations of:
updating the second TSF information and at least part of the second AM information, according to the NAN Beacon frame, when the NAN Beacon frame is used for AM selection, the first AMR is equal to the second AMR, the device role of the device is not set to AM, and one of the following conditions is met: i) the first AMBTT is greater than the second AMBTT; and ii) the first AMBTT is equal to the second AMBTT and the first HC is less than the second HC minus 1.

15. The device according to claim 11, wherein the operation of switching comprises:
updating the second AMR value to equal the MR value of the device;
updating the second HC value to equal zero (0); and
updating the second AMBTT value to equal 0x00000000.

16. The device according to claim 12, wherein the operation of switching comprises:
updating the second AMR value to equal the MR value of the device;
updating the second HC value to equal zero (0); and
updating the second AMBTT value to equal 0x00000000.

17. The device according to claim 13, wherein the operation of switching comprises:
updating the second AMR value to equal the MR value of the device;
updating the second HC value to equal zero (0); and
updating the second AMBTT value to equal 0x00000000.

18. The device according to claim 14, wherein the operation of switching comprises:
updating the second AMR value to equal the MR value of the device;
updating the second HC value to equal zero (0); and
updating the second AMBTT value to equal 0x00000000.

19. The device according to claim 11, wherein when the device role of the device is an AM, the processor is further configured to execute the instructions to perform operations of:
maintaining the device role of the device as an AM when the MR value of the device is updated; and
updating the recorded second AMR to equal an updated MR value of the device.

20. The device according to claim 12, wherein when the device role of the device is an AM, the processor is further configured to execute the instructions to perform operations of:

maintaining the device role of the device as an AM when the MR value of the device is updated; and updating the recorded second AMR to equal an updated MR value of the device.

* * * * *

UNITED STATES PATENT AND TRADEMARK OFFICE
CERTIFICATE OF CORRECTION

PATENT NO. : 9,642,136 B2
APPLICATION NO. : 15/171206
DATED : May 2, 2017
INVENTOR(S) : Du et al.

It is certified that error appears in the above-identified patent and that said Letters Patent is hereby corrected as shown below:

In the Specification

Column 44, Line 66, delete "bus" and insert -- communication bus --, therefor.

In the Claims

Column 52, in Claim 13, Line 7, delete "claim 11" and insert -- claim 11, --, therefor.

Signed and Sealed this
Thirtieth Day of August, 2022

Katherine Kelly Vidal
*Director of the United States Patent and Trademark Office*